(12) United States Patent
Lee et al.

(10) Patent No.: US 9,640,799 B2
(45) Date of Patent: May 2, 2017

(54) NEGATIVE ELECTRODE ACTIVE MATERIAL FOR NON-LITHIUM SECONDARY BATTERY, METHOD OF PREPARING THE SAME, NEGATIVE ELECTRODE FOR NON-LITHIUM SECONDARY BATTERY INCLUDING THE SAME, AND NON-LITHIUM SECONDARY BATTERY INCLUDING THE NEGATIVE ELECTRODE

(71) Applicant: Samsung Electronics Co., Ltd., Suwon-si, Gyeonggi-do (KR)

(72) Inventors: Jaemyung Lee, Seoul (KR); Junhwan Ku, Seongnam-si (KR); Seoksoo Lee, Yongin-si (KR); Wonseok Chang, Seoul (KR); Daeryong Jung, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 203 days.

(21) Appl. No.: 14/537,965

(22) Filed: Nov. 11, 2014

(65) Prior Publication Data

US 2015/0333326 A1   Nov. 19, 2015

(30) Foreign Application Priority Data

May 13, 2014   (KR) .................. 10-2014-0057450

(51) Int. Cl.
  *H01M 4/36*   (2006.01)
  *H01M 4/04*   (2006.01)
  (Continued)

(52) U.S. Cl.
  CPC ............. *H01M 4/626* (2013.01); *H01M 4/04* (2013.01); *H01M 4/366* (2013.01); *H01M 4/387* (2013.01); *H01M 4/466* (2013.01); *H01M 4/48* (2013.01); *H01M 4/583* (2013.01); *H01M 4/587* (2013.01); *H01M 4/62* (2013.01); *H01M 10/054* (2013.01)

(58) Field of Classification Search
  None
  See application file for complete search history.

(56) References Cited

U.S. PATENT DOCUMENTS

2010/0015532 A1   1/2010   Inoue et al.
2010/0259042 A1   10/2010   Spears
(Continued)

FOREIGN PATENT DOCUMENTS

JP   2009-079178 A   4/2009
JP   2013020749 A   1/2013

OTHER PUBLICATIONS

U.S. Appl. No. 14/489,716, filed Sep. 2014, Ise; Kazuki.*
(Continued)

*Primary Examiner* — Patrick Ryan
*Assistant Examiner* — Christopher Domone
(74) *Attorney, Agent, or Firm* — Cantor Colburn LLP

(57) ABSTRACT

A negative electrode active material for a non-lithium secondary battery, the negative electrode active material including a complex including a hard carbon having a specific surface area of about 50 square meters per gram or less and a ratio of a D-band peak intensity to a G-band peak intensity of 1 or less when analyzed by Raman spectroscopy; and a component including at least one selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12.

20 Claims, 18 Drawing Sheets

(51) Int. Cl.
*H01M 4/46* (2006.01)
*H01M 4/48* (2010.01)
*H01M 4/583* (2010.01)
*H01M 4/38* (2006.01)
*H01M 4/62* (2006.01)
*H01M 4/587* (2010.01)
*H01M 10/054* (2010.01)

(56) References Cited

U.S. PATENT DOCUMENTS

| | | | |
|---|---|---|---|
| 2011/0189544 A1* | 8/2011 | Kim | H01M 4/485 |
| | | | 429/231.1 |
| 2012/0015256 A1 | 1/2012 | Komaba et al. | |
| 2012/0115002 A1 | 5/2012 | Fukunaga et al. | |
| 2012/0219856 A1 | 8/2012 | Doe et al. | |
| 2012/0219859 A1 | 8/2012 | Doe et al. | |
| 2013/0130115 A1 | 5/2013 | Park et al. | |
| 2014/0011088 A1* | 1/2014 | Lopatin | H01M 4/02 |
| | | | 429/211 |

OTHER PUBLICATIONS

Xu et al., "Electrochemical Performance of Porous Carbon/Tin composite Anodes for Sodium-Ion and Lithium-Ion Batteries", Adv. Energy Mater., vol. 3, 2013, pp. 128-133.

Zhu et al., "Electrospun Sb/C Fibers for a Stable and Fast Sodium-Ion Battery Anode", ACS NANO, vol. 7, No. 7, 2013. pp. 6378-6386.

\* cited by examiner

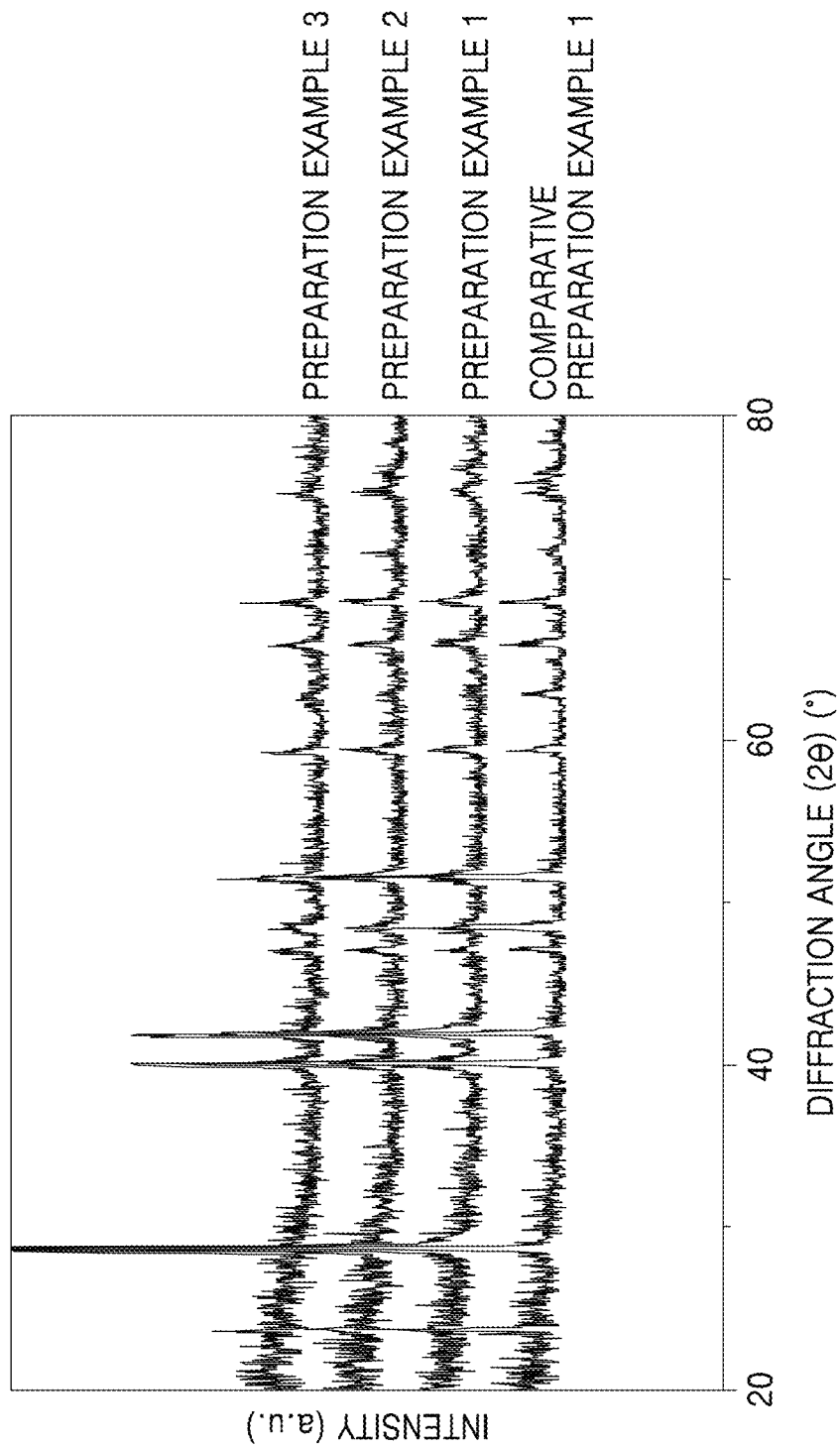

NEGATIVE ELECTRODE ACTIVE MATERIAL FOR NON-LITHIUM SECONDARY BATTERY, METHOD OF PREPARING THE SAME, NEGATIVE ELECTRODE FOR NON-LITHIUM SECONDARY BATTERY INCLUDING THE SAME, AND NON-LITHIUM SECONDARY BATTERY INCLUDING THE NEGATIVE ELECTRODE

RELATED APPLICATION

This application claims priority to and the benefit of Korean Patent Application No. 10-2014-0057450, filed on May 13, 2014, in the Korean Intellectual Property Office, and all the benefits accruing therefrom under 35 U.S.C. §119, the content of which is incorporated herein in its entirety by reference.

BACKGROUND

1. Field

The present disclosure relates to a negative electrode active material for a non-lithium secondary battery, a method of preparing the negative electrode active material, a negative electrode for a non-lithium secondary battery including the negative electrode active material, and a non-lithium secondary battery including the negative electrode.

2. Description of the Related Art

Recently, attention on sodium secondary batteries using sodium ions, instead of lithium ions, has increased. In a sodium secondary battery, a negative electrode is capable of sodium intercalation and deintercalation.

Studies have been done towards an effective carbon-based material as a negative electrode active material for a sodium secondary battery or as a negative electrode active material of a lithium secondary battery.

However, carbon-based materials known thus far have a small sodium intercalation capacity, and an initial efficiency, capacity characteristics, and life characteristics of sodium secondary batteries including such carbons are not satisfactory. Therefore, there remains a need for an improved negative electrode active material for a sodium secondary battery.

SUMMARY

Provided is a negative electrode active material for a non-lithium secondary battery, a method of preparing the negative electrode active material, a negative electrode for a non-lithium secondary battery including the negative electrode active material, and a non-lithium secondary battery including the negative electrode.

Additional aspects will be set forth in part in the description which follows and, in part, will be apparent from the description.

According to an aspect, a negative electrode active material for a non-lithium secondary battery includes a complex including a hard carbon having a specific surface area of about 50 square meters per gram ($m^2/g$) or less and a ratio of a D-band peak intensity to a G-band peak intensity of about 1 or less when analyzed by Raman spectroscopy; and a component including at least one selected from a Group 1 element, an oxide of an a Group 1 element, a Group 2 element, an oxide of a Group 2 element, an element of Groups 13 to 16, an oxide of an element of Groups 13 to 16, and an oxide of an element of Groups 3 to 12.

According to another aspect, a method of preparing a negative electrode active material for a non-lithium secondary battery includes mixing a hard carbon having a specific surface area of about 50 square meters per gram or less and a ratio of a D-band peak intensity to a G-band peak intensity of about 1 or less, when analyzed by Raman spectroscopy, with a component including at least one selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12 at 1000 revolutions per minute or less to form a complex and prepare the negative electrode active material.

According to another aspect, a negative electrode for a non-lithium secondary battery includes a negative electrode active material layer including the negative electrode active material.

According to another aspect, a non-lithium secondary battery includes the negative electrode.

According to another aspect, a sodium secondary battery or a magnesium secondary battery includes the negative electrode.

BRIEF DESCRIPTION OF THE DRAWINGS

These and/or other aspects will become apparent and more readily appreciated from the following description of the embodiments, taken in conjunction with the accompanying drawings in which:

FIG. 2 is a graph of intensity (arbitrary units, a.u.) versus diffraction angle (degrees two-theta, 2θ) showing the results of X-ray diffraction ("XRD") analysis of complexes prepared in Preparation Examples 1 to 3 and a bare Sb powder prepared in Comparative Example 1;

DETAILED DESCRIPTION

Figure 1A:
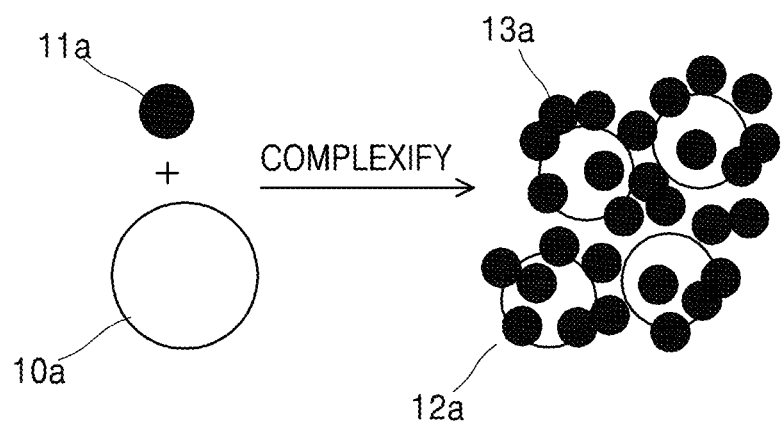
FIG. 1A is a schematic view illustrating an embodiment of a process for forming a negative electrode active material.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. "Or" means "and/or." Expressions such as "at least one of," when preceding a list of elements, modify the entire list of elements and do not modify the individual elements of the list. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkali metal" means a metal of Group 1 of the Periodic Table of the Elements, i.e., lithium, sodium, potassium, rubidium, cesium, and francium.

"Alkaline-earth metal" means a metal of Group 2 of the Periodic Table of the Elements, i.e., beryllium, magnesium, calcium, strontium, barium, and radium.

"Transition metal" as defined herein refers to an element of Groups 3 to 11 of the Periodic Table of the Elements.

"Post-transition metal" means at least one selected from gallium, indium, thallium, tin, lead, and bismuth.

"Metalloid" means at least one selected from B, Si, Ge, As, Sb, and Te.

"Alkyl" as used herein means a straight or branched chain, saturated, monovalent hydrocarbon group (e.g., methyl or hexyl).

"Alkylene" means a straight or branched chain, saturated, divalent aliphatic hydrocarbon group, (e.g., methylene (—$CH_2$—) or, propylene (—$(CH_2)_3$—)).

"Alkenyl" means a straight or branched chain, monovalent hydrocarbon group having at least one carbon-carbon double bond (e.g., ethenyl (—HC═$CH_2$)).

"Aryl" means a monovalent group formed by the removal of one hydrogen atom from one or more rings of an arene (e.g., phenyl or napthyl).

A (meth)acrylate group is inclusive of an acrylate ($H_2C$=CH—C(=O)O—) group or a methacrylate group ($H_2C$=C($CH_3$)—C(=O)O—).

A C rate means a current which will discharge a battery in one hour, e.g., a C rate for a battery having a discharge capacity of 1.6 ampere-hours would be 1.6 amperes.

Hereinafter, a negative electrode active material for a non-lithium secondary battery according to an embodiment, a negative electrode for a non-lithium secondary battery including the negative electrode active material, a method of preparing the negative electrode active material, and a non-lithium secondary battery including the negative electrode will be disclosed in further detail.

According to an embodiment, a negative electrode active material for a non-lithium secondary battery includes complex comprising a hard carbon having a small specific surface area of about 50 square meters per gram ($m^2$/g) or less and a ratio of a D-band peak intensity to a G-band peak intensity of about 1 or less when analyzed by Raman spectroscopy; and a component comprising at least one selected from a Group 1 element, at an oxide of a Group 1 element, a Group 2 element, an oxide of a Group 2 element, an element of Groups 13 to 16 element, an oxide of an element of Groups 13 to 16, and an oxide of an element of Groups 3 to 12.

The term "non-lithium secondary battery" refers to all types of secondary batteries other than lithium secondary batteries using lithium ions. The non-lithium secondary battery may be, for example, a sodium secondary battery or a magnesium secondary battery.

The complex may contain at least one component selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12, and a battery having improved capacity may be manufactured by including the complex. When a complex comprises a hard carbon having the component, the specific surface area, and the disclosed ratio of a D-band peak intensity and a G-band peak intensity above, then, unlike the case of a battery formed of a carbon not having these characteristics, reversible charging and discharging may be repeatedly performed on the battery due to an increase in a reversible capacity of the battery. In this regard, charging/discharging characteristics of the battery may be improved, life characteristics of the battery may be improved, and a decrease in an initial efficiency of the battery may be prevented in advance.

When the complex is formed of the at least one component selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12, and a carbon not having the disclosed characteristics (for example, Super-P or carbon nanotubes ("CNTs")), life characteristics of the battery may improve, but an initial efficiency of the battery may decrease due to an increase in an initial irreversible capacity thereof.

As described above, compared to a carbon not having the disclosed characteristics, the hard carbon having a small specific surface and the disclosed ratio of a D-band peak intensity and a G-band peak intensity may prevent deterioration of an initial efficiency by decreasing an initial irreversible capacity.

A hard carbon is a carbon material having a macromolecular structure which is provided by heat-treating at a high temperature, e.g., 2000° C. or higher, in which a stacking order thereof remains almost unchanged. The hard carbon may have a low degree of crystallinity, e.g., has a degree of crystallinity of less than about 10%, e.g., about 0.1 percent (%) to about 10% or is substantially amorphous, and is also referred to as "hard graphitized carbon." Moreover, during a preparation process of a hard carbon, cross-linking of the hard carbon may be promoted as small molecules are detached, and spaces, from which the small molecules are detached, may be changed into fine pores.

Examples of the hard carbon include carbon fibers prepared by carbonizing intermediates of a carbon fiber in the hard carbon preparation process, at a temperature of about 1000° C. to about 1400° C. and a carbon material prepared by oxidizing an organic compound in air at a temperature of about 150° C. to about 300° C. and then carbonizing at a temperature of about 1000° C. to about 1400° C.

A method of preparing the hard carbon is not particularly limited. For example, the hard carbon may be prepared by carbonizing a carbonaceous material, wherein the carbonaceous material is at least one selected from sucrose, phenol resin, furan resin, furfuryl alcohol, polyacrylonitrile, polyimide, epoxy resin, cellulose, and styrene.

The hard carbon may have a specific surface area (a surface area per unit mass) in a range of about 10 $m^2$/g to about 50 $m^2$/g, for example, about 10 $m^2$/g to about 30 $m^2$/g, or, for example, about 28 $m^2$/g. In this regard, the hard carbon has a specific surface area that is smaller than that of an alternative carbon-based material, for example, Super-P carbon, available from Timcal Graphite and Carbon of Bodio, Switzerland, and has a specific surface area of about 58 $m^2$/g, or carbon nanotubes which have a specific surface are of about 221 $m^2$/g, or mesoporous carbon which has a specific surface area of about 1000 $m^2$/g.

In a Raman spectrum of the hard carbon, a ratio of a D-band peak intensity to a G-band peak intensity (hereinafter, also referred to as an "$I_D/I_G$ ratio") may be in a range of, for example, about 0.9 to about 1, for example, about 0.95 to about 0.99, or, for example, about 0.98. In the Raman spectrum, the D-band peak may be observed at a Raman shift of 1360±60 $cm^{-1}$, and the G-band peak may be observed at 1360±60 $cm^{-1}$. When the $I_D/I_G$ ratio is 1, the D-band peak intensity and the G-band peak intensity are the same. When the $I_D/I_G$ ratio is less than 1, the G-band peak intensity is greater than the D-band peak intensity.

In the Raman spectrum, an $I_D/I_G$ ratio of Super-P, which is an example of an alternative carbon-based material, is about 1.234, and thus, unlike the case of the hard carbon described above, Super-P has an $I_D/I_G$ ratio that is greater than 1.

The hard carbon may be in the form of a particle. For example, an average particle diameter of the hard carbon may be in a range of about 1 nanometer (nm) to about 10 nm, or, for example, about 4 nm to about 5 nm. When an average particle diameter of the hard carbon is within the foregoing range, the hard carbon may have suitable miscibility with the component comprising at least one selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12.

An amount of the hard carbon in the complex may be in a range of about 0.3 part to about 97 parts by weight, for example, about 5 parts to about 70 parts by weight, or for example, about 10 parts to about 70 parts by weight, based on 100 parts by weight of the total weight of the complex. When an amount of the hard carbon is within these ranges, a secondary battery including the complex in a negative electrode active material may have an improved initial efficiency and improved life characteristics.

The component of the complex may include at least one selected from i) an alkali metal, an alkali earth-metal, a post-transition metal, a metalloid, and an oxide thereof; and ii) a transition metal oxide.

Among the at least one component selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12, according to an embodiment, examples of the Group 1 element and oxide thereof may include lithium (Li), sodium (Na), potassium (K), rubidium (Rb), cesium (Cs), and an oxide thereof. Also, examples of the Group 2 element and an oxide thereof may include magnesium (Mg), calcium (Ca), strontium (Sr), barium (Ba), and an oxide thereof.

Examples of the Group 13 element and an oxide thereof may include aluminum (Al), gallium (Ga), indium (In), and an oxide thereof; examples of the Group 14 element and oxide thereof may include silicon (Si), germanium (Ge), tin (Sn), and an oxide thereof; examples of the Group 15 element and oxide thereof may include arsenic (As), antimony (Sb), bismuth (Bi), an oxide thereof, and phosphorus (P); and examples of the Group 16 element and oxide thereof may include tellurium (Te) and an oxide thereof.

Examples of the oxide of a Group 3 element may include a yttrium oxide; examples of the oxide of a Group 4 element include a titanium oxide and a zirconium oxide; examples of the oxide of a Group 5 element may include a vanadium oxide and a niobium oxide; examples of the oxide of a Group 6 element may include a chromium oxide, a molybdenum oxide, and a tungsten oxide; and examples of the oxide of a Group 7 element may include a manganese oxide.

Examples of the oxide of a Group 8 element may include an iron oxide and a ruthenium oxide; examples of the oxide of a Group 9 element include a cobalt oxide, a rhodium oxide, and an iridium oxide; examples of the oxide of Group a 10 element may include a nickel oxide, a palladium oxide, and a platinum oxide; examples of the oxide of a Group 11 element may include a copper oxide and a silver oxide; and examples of the oxide of a Group 12 element may include a zinc oxide and a cadmium oxide. For example, the component may be at least one selected from antimony (Sb), an antimony (Sb) alloy, tin (Sn), a tin (Sn) alloy, lead (Pb), magnesium (Mg), a magnesium (Mg) alloy, calcium (Ca), germanium (Ge), rubidium (Rb), a tin oxide (e.g., $SnO_x$ wherein $0<x\leq2$, an antimony oxide (e.g., $Sb_2O_5$), a magnesium oxide (e.g., $MgO_2$), a germanium oxide (e.g., $GeO_4$), a titanium oxide (e.g., $TiO_2$), a silicon oxide (e.g., $SiO_2$), a vanadium oxide (e.g., $V_2O_5$), and a molybdenum oxide (e.g., $MoO_2$).

Examples of the tin alloy may include a tin-iron alloy (e.g., $Sn_2Fe$) and a tin-antimony alloy (e.g., SnSb).

The at least one component selected from a Group 1 element, a Group 2 element, an element of Groups 13 to 16, an oxide thereof, and an oxide of an element of Groups 3 to 12 may have at least one shape selected from a wire, a rod, and a sphere. The shape may have dimensions on a nanometer scale, e.g., having characteristic dimension of 10 nm or less.

When the component has a spherical shape, an average particle diameter of the component may be in a range of about 0.1 micrometer (μm) to about 10 μm, or about 1 to about 3 μm, or about 1.5 μm to about 2.5 μm. When an average particle diameter of the component is within this range, a negative electrode including the negative electrode active material may have excellent current density characteristics per unit volume without an increase in an initial irreversible capacity of the complex as the negative electrode active material.

In an embodiment, the at least one component selected from a Group 1 element, an oxide of a Group 1 element, a Group 2 element, an oxide of a Group 2 element, an element of Groups 13 to 16, and an oxide of an element of Groups 13 to 16, and an oxide of an element of Groups 3 to 12 may be, for example, antimony (Sb) or a titanium oxide (e.g., $TiO_2$). Here, the titanium oxide may be, for example, a bronze phase titanium oxide; or a titanium oxide having a mixed phase comprising an anatase phase, as a primary phase, and a rutile phase, as an auxiliary phase.

The titanium oxide may have at least one shape selected from a wire, a rod, and a sphere. The shape may have dimensions on a nanometer scale, e.g., having a characteristic dimension of 10 nm or less. Thus, the complex according to an embodiment may have a shape of a nanowire, rod, or particle. The titanium oxide may have a shape of a nanowire, rod, or particle.

The bronze phase titanium oxide is a metastable monoclinic material of a titanium oxide which may have a charging/discharging voltage of 1.6 V, a capacity of about 250 mAh/g, and a density of about 3.73 grams per cubic centimeter (g/cc), unlike the titanium oxide having an anatase phase and the titanium oxide having a rutile phase. When a complex including the bronze phase titanium oxide and hard carbon is used, a non-lithium secondary battery with improved conductivity and life characteristics may be manufactured while increasing a capacity of the battery.

The negative electrode active material may comprise the component and hard carbon assembled together in a spherical shape, wherein the component may be, for example, at least one selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12.

The complex may include secondary particles, which are agglomerates of primary particles, and an average particle diameter of the secondary particles may be in a range of about 1 μm to about 5 μm. When the secondary particles having an average particle diameter within this range is used, the battery may have an improved initial efficiency and a decreased irreversible capacity.

According to another embodiment, the component is magnesium or a magnesium alloy. For example, the magnesium alloy includes at least one selected from magnesium, aluminum, and zinc.

FIG. 1A schematically illustrates an embodiment of a process of forming the complex.

Referring to FIG. 1A, a hard carbon 11a having a specific surface area of about 50 m$^2$/g or less and a $I_D/I_G$ ratio in the Raman spectrum of about 1 or less, for example, from about 0.9 to about 1, and a component 10a that is at least one selected from a Group 1 element, an oxide of a Group 1 element, a Group 2 element, an oxide of a Group 2 element, an element of Groups 13 to 16, an oxide of Groups 13 to 16, and an oxide of an element of Groups 3 to 12 are complexed to form a complex 12a.

As shown in FIG. 1A, the complex 12a has a structure in which a hard carbon 13a is disposed on, e.g., is coated on a surface of the component 10a, which is at least one selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12. In an embodiment, the hard carbon may be on an outer surface of the component.

According to another embodiment, the complex 12a may have a structure comprising a single particle comprising the hard carbon and at least one selected from a Group 1 element, an oxide of a Group 1 element, a Group 2 element, an oxide of a Group 2 element, as element of Groups 13 to 16, an oxide of an element of Groups 13 to 16, and an oxide of an element of Groups 3 to 12.

Also, according to another embodiment, the complex may have a structure in which at least one selected from a Group 1 element, an oxide of a Group 1 element, a Group 2 element, an oxide of a Group 2 element, an element of Groups 13 to 16, an oxide of Groups 13 to 16, and an oxide of an element of Groups 3 to 12 is embedded in a hard carbon matrix.

Figure 1B:
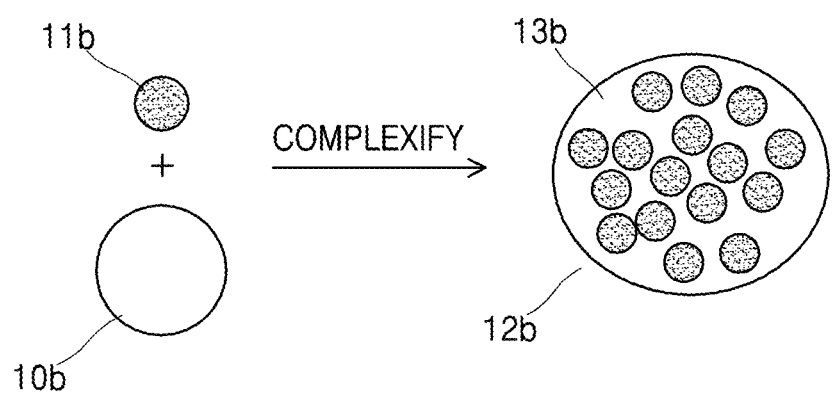
FIG. 1B is a schematic view illustrating an embodiment of an alternative process for forming a negative electrode active material.

For comparison with FIG. 1A, FIG. 1B schematically illustrates a process of forming a complex formed of an alternative carbon-based material, such as Super-P or Ketjen black carbon.

Referring to FIG. 1B, a complex 12b comprising an alternative carbon-based material has a structure in which a metal is dispersed in a carbon matrix 13b. The complex 12b has a high initial irreversible capacity due to the carbon matrix 13b having a high irreversible capacity, and thus an initial efficiency of a battery including the complex 12b may significantly decrease.

Hereinafter, a method of preparing a negative electrode active material will be further disclosed.

A desired negative electrode active material may be obtained by mixing a component that is at least one selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12; and a hard carbon that has a specific surface area of about 50 m$^2$/g or less and a I$_D$/I$_G$ ratio in the Raman spectrum analysis of 1 or less at a predetermined mixing ratio.

The mixing is performed by milling in an inert gas atmosphere and under mild conditions.

The inert gas atmosphere may be provided using at least one selected from argon, helium, and nitrogen. In an embodiment, the inert gas atmosphere consists essentially of, or consists of, at least one selected from argon, helium, and nitrogen.

In the process of milling under mild conditions, a speed of the mixer may be selected depending on an amount of a material to be processed and a type of a milling device.

In an embodiment, the milling comprises mixing at about 1000 revolutions per minute (rpm) or less, for example, about 700 rpm or less, for example, about 100 rpm to about 500 rpm, or, for example, about 300 rpm, and a mixing time is less than about 2 hours, for example, about 5 minutes to about 1.5 hours, or about 10 minutes to about 1 hour, or for example, about 30 minutes.

When the milling is performed under the conditions described above, a desired complex may be obtained. Also, the complex forming the negative electrode active material may be pulverized into particles having an appropriate particle diameter, and thus a specific surface area of the complex may be controlled to be about 50 m$^2$/g or less while controlling an average particle diameter of the negative electrode active material to be in a range of about 1 μm to about 5 μm. When the average particle diameter and the specific surface area of the complex are within these ranges above, surface characteristics of the negative electrode active material may be improved, and extremely fine particlization of the negative electrode active material during a charging/discharging process and/or an electrode rolling process may be prevented. Thus, when a secondary battery includes a negative electrode including the negative electrode active material, an initial efficiency and life characteristics of the secondary battery may significantly improve.

For, example, the milling may be performed using a milling device that is selected from a planetary mill, a ball mill, an attrition mill, a vibration mill, a disk mill, a jet mill, a bead mill, and a rotor mill. In the mixing process using the milling device, beads may be used. A material of the beads may be, but are not limited to, zirconia beads or alumina beads. Also, a particle size of the beads may be in a range of about 0.5 millimeter (mm) to about 2 mm.

An amount of the hard carbon may be in a range of about 0.3 part to about 70 parts by weight, for example, about 10 parts to about 70 parts by weight, based on 100 parts by weight of the component that is at least one selected from a Group 1 element, an oxide of a Group 1 element, a Group 2 element, an oxide of a Group 2 element, an element of Groups 13 to 16, an oxide of an element of Groups 13 to 16, and oxide of an element of Groups 3 to 12.

According to another embodiment, a negative electrode for a non-lithium secondary battery and a non-lithium secondary battery including the negative electrode, where the negative electrode has a negative electrode active material layer including the negative electrode active material described above. Here, examples of the non-lithium secondary battery include a sodium secondary battery and a magnesium secondary battery.

Hereinafter, a method of preparing the negative electrode according to another embodiment and a sodium secondary battery or a magnesium secondary battery that include the negative electrode will be disclosed in further detail.

A composition for forming a negative electrode active material layer, the composition including a negative electrode active material, a binder, a conducting agent, and a solvent is prepared, and a current collector is coated with the composition, and then, the current collector coated with the composition is dried and pressed to prepare a negative electrode, on which a negative electrode active material layer is formed, on the negative electrode current collector.

When coating the current collector with the composition for forming a negative electrode active material layer, a method of coating the composition is not particularly limited. For example, the composition may be coated on the current collector using an inkjet method, a doctor blade method, or a coater.

The current collector coated with the composition may be pressed using a press unit, such as a calender roll or a flat press.

The binder may be a polymer of a fluorinated compound (i.e., a fluorine-based polymer). The fluorinated compound may be, for example, a C1 to C18 fluoroalkyl(meth)acrylate, a C1 to C18 perfluoroalkyl(meth)acrylate (e.g., perfluorododecyl(meth)acrylate, perfluoron-octyl(meth)acrylate, or perfluoron-butyl(meth)acrylate), a C1 to C18 perfluoroalkyl-substituted alkyl(meth)acrylate (e.g., perfluoroethyl hexyl(meth)acrylate, perfluorooctylethyl(meth)acrylate), perfluoro-oxy-alkyl(meth)acrylate (e.g., perfluorododecyl-oxy-ethyl(meth)acrylate or perfluorodecyl-oxy-ethyl(meth) acrylate), a C1 to C18 fluoroalkylcrotonate, C1 to C18 fluoroalkylmaleate, C1 to C18 fluoroalkylmaleate fumarate, C1 to C18 fluoroalkylitaconate, a C2 to C10 fluoroalkyl-substituted olefin having 1 to 17 fluorine atoms; for example, a perfluoro olefin, or a C2 to C10 fluorinated olefin having 1 to 20 fluorine atoms, in which a fluorine atom is bound with a carbon of a double bond, tetrafluoroethylene, trifluoroethylene, vinylidene fluoride, or hexafluoropropylene.

Also, a binder may be a copolymer of a fluorine compound and a monomer including no fluorine atoms and including an ethylenic double bond.

Also, a binder may be a non-fluorinated polymer.

The non-fluorinated polymer is a polymer including no fluorine. For example, a non-fluorinated polymer may be an addition polymer of a monomer including no fluorine atoms and including an ethylenic double bond. Examples of the monomer include a C1 to C22 (cyclo)alkyl (meth)acrylate [for example, methyl (meth)acrylate, ethyl (meth)acrylate, n-butyl (meth) acrylate, iso-butyl (meth) acrylate, cyclohexyl (meth) acrylate, 2-ethylhexyl (meth) acrylate, isodecyl (meth)acrylate, lauryl (meth)acrylate, and octadecyl (meth) acrylate]; a C4 to C24 aromatic ring-containing (meth) acrylate [for example, benzyl (meth)acrylate and phenylethyl (meth)acrylate]; a mono(meth)acrylate of a C2 to C4 alkyleneglycol or a C2 to C4 dialkyleneglycol [for example, 2-hydroxyethyl (meth)acrylate, 2-hydroxypropyl (meth) acrylate, and diethylene glycol mono(meth)acrylate]; a (poly)glycerin mono(meth)acrylate having a degree of polymerization of 1 to 4; a (meth)acrylic acid ester monomer such as a polyfunctional (meth)acrylate [for example, a (poly)ethylene glycol di(meth)acrylate having a degree of polymerization of 1 to 100, a (poly)propylene glycol di(meth)acrylate having a degree of polymerization of 1 to 100, 2,2-bis(4-hydroxyethyl phenyl)propane di(meth)acrylate, and trimethylolpropane tri(meth)acrylate]; a (meth)acrylamide monomer such as (meth)acrylamide and a (meth)acrylamide derivative [for example, N-methylol (meth)acrylamide and diacetone acrylamide]; a cyano group-containing monomer such as (meth)acrylonitrile, 2-cyanoethyl (meth) acrylate, and 2-cyanoethyl acrylamide; a styrene monomer such as styrene and styrene derivatives having 7 to 18 carbon atoms [for example, α-methylstyrene, vinyl toluene, p-hydroxystyrene, and divinylbenzene]; a diene monomer such as a C4 to C12 alkadiene [for example, butadiene, isoprene, and chloroprene]; a C2 to C12 alkenyl ester monomer such as carboxylic acid vinyl ester [for example, vinyl acetate, vinyl propionate, vinyl butyrate, and vinyl octanoate] and a C2 to C12 carboxylic acid (meth)allyl ester [for example, (meth)allyl acetate, (meth)allyl propionate, and (meth)allyl octanoate]; an epoxy group-containing monomer such as a glycidyl (meth)acrylate and (meth)allyl glycidyl ether; a monoolefin such as a C2 to C12 monoolefin [for example, ethylene, propylene, 1-butene, 1-octene, and 1-dodecene]; a monomer containing a chlorine atom, a bromine atom, or an iodine atom, a monomer containing a halogen atom other than fluorine such as vinyl chloride and vinylidene chloride; a (meth)acrylic acid such as acrylic acid and methacryl acid; and a conjugated double bond-containing monomer such as butadiene and isoprene. Examples of the monomer may include polyethylene and polypropylene. Also, examples of the addition polymer may include copolymers such as an ethylenevinyl acetate copolymer, a styrene-butadiene copolymer, and an ethylene-propylene copolymer. A carboxylic acid vinyl ester polymer derived from the carboxylic acid vinyl ester may be partially or completely saponificated as in polyvinyl alcohol.

Also, examples of the binder may include a polysaccharide such as starch, methylcellulose, carboxymethylcellulose, hydroxymethylcellulose, hydroxyethylcellulose, hydroxypropylcellulose, carboxymethylhydroxyethylcellulose, and nitrocellulose, and derivatives thereof; a phenol resin; a melamine resin; a polyurethane resin; a urea resin; a polyamide resin; a polyimide resin; a polyamide-imide resin; petroleum pitch; and coal pitch. Also, the binder may serve as a thickening agent in an electrode material.

Also, examples of the binder may include inorganic granules, for example, colloidal silica.

Examples of the binder may include carboxymethylcellulose, a vinylidene flouride/hexafluoropropylene copolymer, polyvinylideneflouride ("PVDF"), polyacrylonitrile, polymethylmethacrylate, polytetrafluoroethylene, and a combination thereof, or a styrene butadiene rubber-based polymer, but is not limited thereto, and any suitable binder available in the art may be used.

An amount of the binder may be about 1 part to about 20 parts by weight, for example, about 1 part to about 10 parts by weight, based on 100 parts by weight of the total weight of the negative electrode active material layer.

The conducting agent may be a carbon material having a suitable specific surface area, for example, carbon black, active carbon, acetylene black, graphite granules, or a combination of one type thereof. Also, the conducting agent may be electrically conductive fibers, such as fibers that are produced during carbonization of vapor-grown carbon or pitch (a by-product of petroleum, coal, or coal tar) at a high temperature, carbon fibers prepared from acryl fibers (polyacrylonitrile), or a mixture including at least one selected therefrom, but is not limited thereto, and any suitable conducting agent available in the art may be used.

Carbon fibers and a carbon material with a suitable specific surface area may be simultaneously used. When carbon fibers and a carbon material with a suitable specific surface area are simultaneously used, electrical conductivity of the conducting agent may improve. Also, the conducting agent may be a metal-based conducting agent that is not dissociated by being oxidized within a range of charging and discharging of a positive electrode and that has a low resistance compared to that of a positive electrode active material. For example, the conducting agent may comprise a corrosion resistive metal, such as titanium or gold; a carbide, such as SiC or WC; or a nitride, such as $Si_3N_4$ or BN. However, a material for forming the conducting agent used in preparation of the positive electrode is not particularly thereto, and any suitable material available in the art for a conducting agent may be used.

An amount of the conducting agent may be in a range of about 1 part to about 20 parts by weight, for example, about 1 part to about 10 parts by weight, based on 100 parts by weight of the total weight of the negative electrode active material layer.

The negative electrode active material layer may further include a supporting salt or an ion conductive polymer in addition to the binder and the negative electrode active material. Also, when the negative electrode active material layer includes an ion conductive polymer, a polymerization initiator for polymerizing the polymer may be added. Also, a mixing ratio of the components is not particularly limited, and any suitable mixing ratio that is used in preparation of a sodium secondary battery may be used.

Examples of the current collector may include metal such as nickel, aluminum, titanium, copper, gold, silver, platinum, aluminum alloy, or stainless steel; substances formed by plasma spraying or arc spraying, for example, carbonaceous materials, activated carbon fiber, nickel, aluminum, zinc, copper, tin, lead, or alloys thereof; and conductive films obtained by dispersing a conductive agent in a resin such as rubber or styrene-ethylene-butylene-styrene copolymer ("SEBS"). For example, the current collector may comprise aluminum, nickel, or stainless steel, among which aluminum may be used in that it can be easily processed into a thin film and is inexpensive. Examples of the shape of the current collector include foil, flat plate, mesh, net, perforated metal or emboss, or a combination of these shapes (for example, meshed flat plate). Irregularities may be formed on the surface of the current collector by etching the surface. Also, a thickness of the current collector may be in a range of about 5 µm to about 30 µm, but is not limited thereto.

A size of the current collector may vary depending on purpose of use of the battery. When a large-sized electrode used in a large-sized battery is manufactured, a current collector having a large surface area is used. When a small-sized electrode is manufactured, a current collector having a small surface area.

Examples of a positive electrode included in a sodium secondary battery may include sodium metal or a positive electrode having a positive electrode active material and a current collector.

A positive electrode current collector may comprise, for example, aluminum or stainless steel.

Examples of the positive electrode active material may include a metal sulfide, such as $Ag_2S$, $As_2S_3$, CdS, CuS, $Cu_2S$, FeS, $FeS_2$, HgS, $MoS_2$, $Ni_3S_2$, NiS, $NiS_2$, PbS, $TiS_2$, MnS, and $Sb_2S_3$; and a mixture of the metal sulfide and a transition metal. Here, the transition metal may be at least one selected from Sc, Ti, V, Cr, Mn, Fe, Co, Ni, Cu, Zn, Y, Zr, Nb, Mo, Tc, Ru, Rh, Pd, Ag, Cd, Lu, Hf, Ta, W, Re, Os, Ir, Pt, Au, Hg, Lr, Rf, Db, Sg, Bh, Hs, Mt, Ds, Rg, and Uub.

The positive electrode active material for a sodium secondary battery may comprise a sodium inorganic compound capable of being doped and dedoped with sodium ions (hereinafter, also referred to as "sodium compound") and may be formed of an oxide represented by the formula $NaM^1_aO_2$ such as $NaFeO_2$, $NaMnO_2$, $NaNiO_2$, or $NaCoO_2$, an oxide represented by the formula $Na_{0.44}Mn_{1-a}M^1_aO_2$ wherein $M^1$ is at least one transition metal element, and $0 \le a < 1$, an oxide represented by the formula $Na_{0.7}Mn_{1-a}M^1_aO_{2.05}$ wherein $M^1$ is at least one transition metal element, and $0 \le a < 1$; an oxide represented by the formula $Na_bM^2_cSi_{12}O_{30}$ such as $Na_6Fe_2Si_{12}O_{30}$ or $Na_2Fe_5Si_{12}O_{30}$ wherein $M^2$ is at least one transition metal element, $2 \le b \le 6$, and $2 \le c \le 5$; an oxide represented by the formula $Na_dM^3_eSi_6O_{18}$ such as $Na_2Fe_2Si_6O_{18}$ or $Na_2MnFeSi_6O_{18}$ wherein $M^3$ is at least one transition metal element, $3 \le d \le 6$, and $1 \le e \le 2$; an oxide represented by the formula $Na_fM^4_gSi_2O_6$ such as $Na_2FeSiO_6$ wherein $M^4$ is a transition metal element, at least one element selected from the group consisting of Mg and Al, and $1 \le f \le 2$; a phosphate such as $NaFePO_4$ or $Na_3Fe_2(PO_4)_3$; a borate such as $NaFeBO_4$ or $Na_3Fe_2(BO_4)_3$; and a fluoride represented by the formula $Na_hM^5F_6$ such as $Na_3FeF_6$ or $Na_2MnF_6$ wherein $M^5$ is at least one transition metal element, and $2 \le h \le 3$. However, a material for forming a positive electrode active material is not limited thereto, and any material available in the art that does not deteriorate performance of a sodium battery may be used to form a positive electrode active material.

The positive electrode active material may be, for example, $NaMn_2O_4$, $NaNiO_2$, $NaCoO_2$, $NaFeO_2$, $NaNi_{0.5}Mn_{0.5}O_2$, or $NaCrO_2$.

The positive electrode may include other components in addition to the positive electrode active material. For example, examples of the other components may include a binder, a conducting agent, a supporting electrolyte, and an ion conductive polymer. The binder and the conducting agent are as defined in the negative electrode.

In the case of the positive electrode having a positive electrode active material and a current collector, a method of preparing the positive electrode is not particularly limited, and the positive electrode may be prepared using the same method used in preparation of the negative electrode. That is, a composition for forming a positive electrode active material layer is prepared by mixing the positive electrode active material, a binder, and, if desired, other materials in a solvent. Then, a current collector is coated with the composition for forming a positive electrode active material layer and dried to form a positive electrode active material layer on the current collector, and thus a positive electrode may be manufactured.

In the case of a magnesium secondary battery, a positive electrode active material may comprise a transition metal compound or a magnesium composite metal oxide capable of intercalating and deintercalating magnesium ions. For example, a positive electrode active material may be at least one selected from an oxide, a sulfide, a halide, and a magnesium composite metal oxide of a metal that is at least one selected from scandium, ruthenium, titanium, vanadium, molybdenum, chromium, manganese, iron, cobalt, nickel, copper, and zinc.

The positive electrode active material for a magnesium secondary battery may be, for example, $TiS_2$, $ZrS_2$, $RuO_2$, $Co_3O_4$, $Mo_6S_8$, or $V_2O_5$. Also, an example of the magnesium composite metal oxide may be a magnesium-based compound represented by the formula $Mg(M_{1-x}A_x)O_4$ (wherein, $0 \le x \le 0.5$, M is at least one selected from Ni, Co, Mn, Cr, V, Fe, Cu, and Ti, and A is at least one selected from Al, B, Si, Cr, V, C, Na, K, and Mg).

In the case of the magnesium secondary battery, the current collector is desirably stable without causing any electrochemical change in the battery including the current collector. When the current collector is corroded, the battery may not have sufficient current collecting capabilities with repeated cycling of the battery, resulting in reduced battery lifespan.

The current collector for a magnesium secondary battery may comprise, for example, stainless steel. For example, the current collector may comprise a material having a metal substrate coated with a primer including a conductive material and a polymer material.

The metal substrate is stable at an electric potential of the magnesium secondary battery, and any suitable metal without particular limitation may be used as long as the metal may supply and transmit electrons. Examples of the metal for the metal substrate include stainless steel, nickel, and titanium, preferably stainless steel. The metal substrate has a thickness of about 1 µm to about 150 µm and may be formed in various forms including foils, films, sheets, nets, porous structures, and foams, preferably foils.

The primer suppresses an increase of internal resistance as much as possible and increases adhesive strength of the positive electrode active material to the metal substrate. For example, a weight ratio of the conductive material to the polymer material may be in a range of about 1:10 to about 10:1. When the content of the conducting agent is within this range above, desired adhesive strength may be provided without deteriorating operation characteristics of the battery due to an increase in the internal resistance.

Examples of the conductive material may include at least one material selected from graphite, carbon black, acetylene black, Ketjen black, channel black, furnace black, lamp black, carbon fiber, and carbon fluoride, but is not limited thereto. Preferably, the conductive material is carbon black. The conductive material may have a particle diameter of about 10 nm to about 100 nm.

Examples of the polymer material may include at least one selected from a polyimide-based copolymer, an acrylate-based copolymer, polyvinylidene fluoride, polyvinyl alcohol, carboxymethyl cellulose ("CMC"), starch, hydroxypropyl cellulose, regenerated cellulose, polyvinyl pyrrolidone, tetrafluoroethylene, polyethylene, polypropylene, ethylene-propylene-diene terpolymer ("EPDM"), sulfonated EPDM, styrene-butylene rubbers, and fluorine rubber, but are not limited thereto. For example, a polyimide-based copolymer may be used as the polymer material.

The primer layer may have a thickness of 100 nm to 1 μm and may be a film-type layer with a uniform thickness or a cluster-type layer without having a uniform thickness. Particularly, since the cluster-type primer layer has high specific surface area, it provides better adhesive strength than the film-type primer layer when the positive electrode active material is attached thereto, so that the cluster-type layer is more suitable. When the cluster-type primer layer is formed, stainless steel is preferably used as the metallic base.

The primer layer may be formed on one or both surfaces of the current collector, preferably on both surfaces thereof.

The primer layer may be applied to the surface of the current collector using, for example, a method including preparing a coating solution by adding the conductive material and the polymer to a solvent, coating the solution on the current collector, and removing the solvent. Examples of the solvent include, N-methylpyrrolidone, water, methyl isobutyl ketone, and isopropanol, but are not limited thereto.

A sodium secondary battery may further include an alternative negative electrode for a sodium secondary battery in addition to the negative electrode disclosed herein.

Examples of the general negative electrode may include an electrode including sodium metal or a sodium alloy or an electrode including a sodium metal or a sodium alloy stacked on a current collector. Also, the negative electrode may be an electrode having a sodium inorganic compound (a sodium compound) capable of doping and de-doping of sodium ions. Here, the sodium compound may be the same sodium compound described in the preparation of the positive electrode.

When a negative electrode active material is used in addition to a sodium metal or a sodium alloy, a carbon-based material having a graphene structure may be used. A mixed negative electrode of a material such as graphite or graphitized carbon, a mixed negative electrode of a carbon-based material and a metal or an alloy, or a composite negative electrode may be used. Examples of the carbon-based material may include carbonaceous materials, such as natural graphite, artificial graphite, mesophase carbon, expanded graphite, carbon fibers, carbon fibers prepared by using a vapor phase growth method, pitch-based carbonaceous materials, needle coke, petroleum coke, polyacrylonitrile-based carbon fibers, and carbon black; cyclic hydrocarbons having five-membered ring or six-membered ring; and an amorphous carbon material synthesized by thermal decomposition of an oxygen-containing cyclic organic compound.

For example, the negative electrode may be a metal having a thickness of about 3 μm to about 500 μm and may be in any suitable shape, such as a film, sheet, foil, net porous body, foam, or non-woven shape.

A magnesium secondary battery may further include an alternative negative electrode active material in addition to the negative electrode disclosed above.

The negative electrode may include a magnesium metal, a magnesium metal-based alloy, or a magnesium intercalation compound, but is not limited thereto. The negative electrode may be any suitable material available in the art as a negative electrode active material that includes magnesium or may allow intercalation/deintercalation of magnesium.

Examples of the magnesium metal-based alloy may include a magnesium alloy with aluminum, tin, indium, calcium, titanium, or vanadium.

For example, the negative electrode may be a magnesium containing metal having a thickness of about 3 μm to about 500 μm and may any suitable shape such as a film, sheet, foil, net porous body, foam, or non-woven shape.

The non-lithium secondary battery may include a separator disposed between a positive electrode and a negative electrode.

The separator is disposed between the positive electrode and the negative electrode and may be an insulating thin film having a suitable ion permeability and mechanical strength.

The separator may have any composition that allows the separator to tolerate in an environment where a sodium secondary battery or a magnesium secondary battery is being used.

The separator may have a pore diameter of about 0.01 μm to about 10 μm and a thickness of about 5 μm to about 20 μm. Examples of the separator may include an olefin-based polymer such as polypropylene that is suitably chemically resistant and hydrophobic; or a sheet or non-woven fabric comprising glass fibers or polyethylene. When a solid electrolyte, such as a polymer, is used as an electrolyte, the solid electrolyte may serve as a separator as well.

Examples of the olefin-based polymer may include a monolayer comprising polyethylene, polypropylene, polyvinylidene fluoride, or a multilayer material including at least one layer formed thereof. The multilayer material may be a mixed multilayer material, for example, a two-layered separator having a structure of polyethylene/polypropylene, a three-layered separator having a structure of polyethylene/polypropylene/polyethylene, or a three-layered separator having a structure of polypropylene/polyethylene/polypropylene.

For example, the separator may be prepared in the manner described as follows.

A separator composition is prepared by mixing a polymeric resin, a filler, and a solvent. The separator may be formed by directly coating and drying the separator composition on the top of a negative electrode active material layer. Alternatively, the separator may be formed by casting and drying the separator composition on a support, and then laminating a separator film detached from the support onto the negative electrode active material layer.

The polymeric resin used to prepare the separator is not particularly limited, and any suitable material used as a binder of an electrode plate may be used. For example, polyethylene, polypropylene, vinylideneflouride/hexafluoropropylene copolymer, polyvinylideneflouride ("PVDF"), polyacrylonitrile, polymethylmethacrylate, or a combination thereof, may be used. The filler may be inorganic particles, and the solvent may be any suitable material available in the art as long as the polymer resin may be dissolved in the solvent and pores may be formed in the polymer resin when dried.

Also, the separator may be separately prepared and laminated on the top of the negative electrode active material using another method. For example, a dry method wherein a film is formed by melt extrusion of polypropylene and polyethylene, and the resulting film is annealed at a suitable temperature to grow crystal domains and extended to form a microporous film by extending a non-crystalline region may be used. Alternatively, a wet method wherein a film is formed after mixing hydrocarbon medium and the other low molecular weight materials with polypropylene and polyethylene, and by removing the medium and the low molecular materials with more highly volatile medium from the resulting film where the medium and the low molecular materials are aggregated and an island phase begins to appear, to form a microporous film, may be used to form the separator.

Moreover, in order to control the strength or hardness, and thermal shrinkage rate of the separator, an additive, for example, non-conductive particles, a filler, or a fibrous compound may be further added to the separator. For example, the separator may further include inorganic particles. The further inclusion of the inorganic particles may improve oxidation resistance of the separator and suppress deterioration of battery characteristics.

For example, the inorganic particles may comprise alumina (e.g., $Al_2O_3$), silica (e.g., $SiO_2$), or titania (e.g., $TiO_2$) particles. The inorganic particles may have an average particle diameter of from about 10 nm to about 5 µm. When the average particle diameter of the inorganic particles is within this range, the inorganic particles may easily diffuse without deteriorating crystalline characteristics of the inorganic particles.

In order to increase the tearing strength and mechanical strength of the separator, the separator may be manufactured to have a multi-layer structure including at last one polymer layer, for example, as a polyethylene/polypropylene laminate, a polyethylene/polypropylene/polyethylene laminate, or a non-woven fabric/polyolefin laminate.

Hereinafter, an electrolyte of a non-lithium secondary battery will be disclosed in further detail.

An electrolyte for a sodium secondary battery includes a sodium salt and an organic solvent.

The sodium salt may be any suitable material commonly used as a sodium salt in the art. Examples of the sodium salt may include $NaClO_4$, $NaPF_6$, $NaBF_4$, $NaCF_3SO_3$, $NaN(CF_3SO_2)_2$, $NaN(C_2F_5SO_2)_2$, and $NaC(CF_3SO_2)_3$, but are not limited thereto, and any suitable material available as a sodium salt in the art may be used. For example, when sodium is substituted for lithium in a salt that is a lithium salt of a lithium battery, the salt may be used as a sodium salt in a non-lithium secondary battery.

A concentration of the sodium salt may be appropriately set in consideration of a solubility of the electrolyte with respect to an electrolyte solution. A concentration of the sodium salt may be in a range of about 0.1 molar (M) to about 5 M, for example, about 0.3 M to about 3 M, or, for example, about 0.8 M to about 1.5 M. When the concentration of the sodium salt is within these ranges, inner resistance characteristics of the sodium secondary battery may be excellent.

The organic solvent may be a non-aqueous organic solvent which has a high oxidation potential and is capable of dissolving the sodium salt. Examples of the non-aqueous organic solvent include a carbonate-based solvent, an ester-based solvent, and an ether-based solvent. Also, propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, fluoroethylene carbonate, benzonitrile, acetonitrile, tetrahydrofuran, 2-methyl tetranydrofuran, γ-butyrolactone, dioxolane, 4-methyldioxolane, N,N-dimethylformamide, N,N-dimethylacetamide, N,N-dimethylsulfoxide, dioxane, 1,2-dimethoxy ethane, sulfolane, dichloroethane, chlorobenzene, nitrobenzene, diethylene glycol, dimethylether, or a combination thereof may be used as the non-aqueous organic solvent.

Various additives may be added to the electrolyte if desired. For example, in order to improve charging/discharging characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, or aluminum trichloride. If desired, in order to impart incombustibility, the electrolyte may further include a halogen-containing solvent such as carbon tetrachloride or ethylene trifluoride.

In the case of a magnesium secondary battery, an electrolyte may include a magnesium salt and a non-aqueous organic solvent. Also, the electrolyte of the magnesium secondary battery may comprise any suitable material that may form an electrochemically stable electrolyte solution at a base potential of about 1 V or higher with respect to metallic magnesium for stable performance of the magnesium secondary battery.

The magnesium salt may be of the formula RMgX (wherein R is a C1-C10 linear or branched alkyl group, a C6-C10 linear or branched aryl group, or a C1-C10 linear or branched amine group), $MgX_2$ (wherein X is a halogen atom), $R_2Mg$ (wherein R is a C1-C20 alkyl group, a C1-C20 dialkylboron group, a C6-C20 diarylboron group, a C1-C20 alkylcarbonyl group, or a C1-C20 alkylsulfonyl group), $MgClO_4$, or a combination of one or more thereof, but is not limited thereto.

In RMgX, R may be, for example, a methyl group, an ethyl group, a butyl group, a phenyl group, or an aniline group, and X may be a halogen atom, for example, chlorine or bromine. Also, in $MgX_2$, X may be, for example, chlorine or bromine.

In $R_2Mg$, an alkyl carbonyl group may be, for example, a methylcarbonyl group ($—CO_2CH_3$), and an alkyl sulfonyl group may be, for example, a trifluoromethylsulfonyl group ($—SO_2CF_3$).

The magnesium salt may be, for example, $Mg(AlCl_2BuEt)_2$ (wherein Bu is a butyl group, and Et is an ethyl group), $Mg(ClO_4)_2$, $Mg(PF_6)_2$, $Mg(BF4)_2$, $Mg(CF_3SO_3)_2$, $MgN(CF_3SO_2)$, $MgN(C_2F_5SO_2)_2$, or $MgC(CF_3SO_2)_3$.

A concentration of the magnesium salt may be appropriately set in consideration of a solubility of an electrolyte with respect to an electrolyte solution. In general, a concentration of the magnesium salt is in a range of about 0.2 M to about 5 M, for example, about 0.3 M to about 3 M, or, for example, about 0.8 M to about 1.5 M. When the concentration of the magnesium salt is within these ranges, inner resistance characteristics of the magnesium secondary battery may be improved.

For example, the electrolyte for a magnesium secondary battery may have a composition including $Mg(AlCl_2BuEt)_2$/THF. Here, Bu is a butyl group, and Et is an ethyl group.

The non-aqueous organic solvent used in the electrolyte for a magnesium secondary battery may be the same as the non-aqueous organic solvent, and the same additives may be further added to the electrolyte.

Figure 1C:
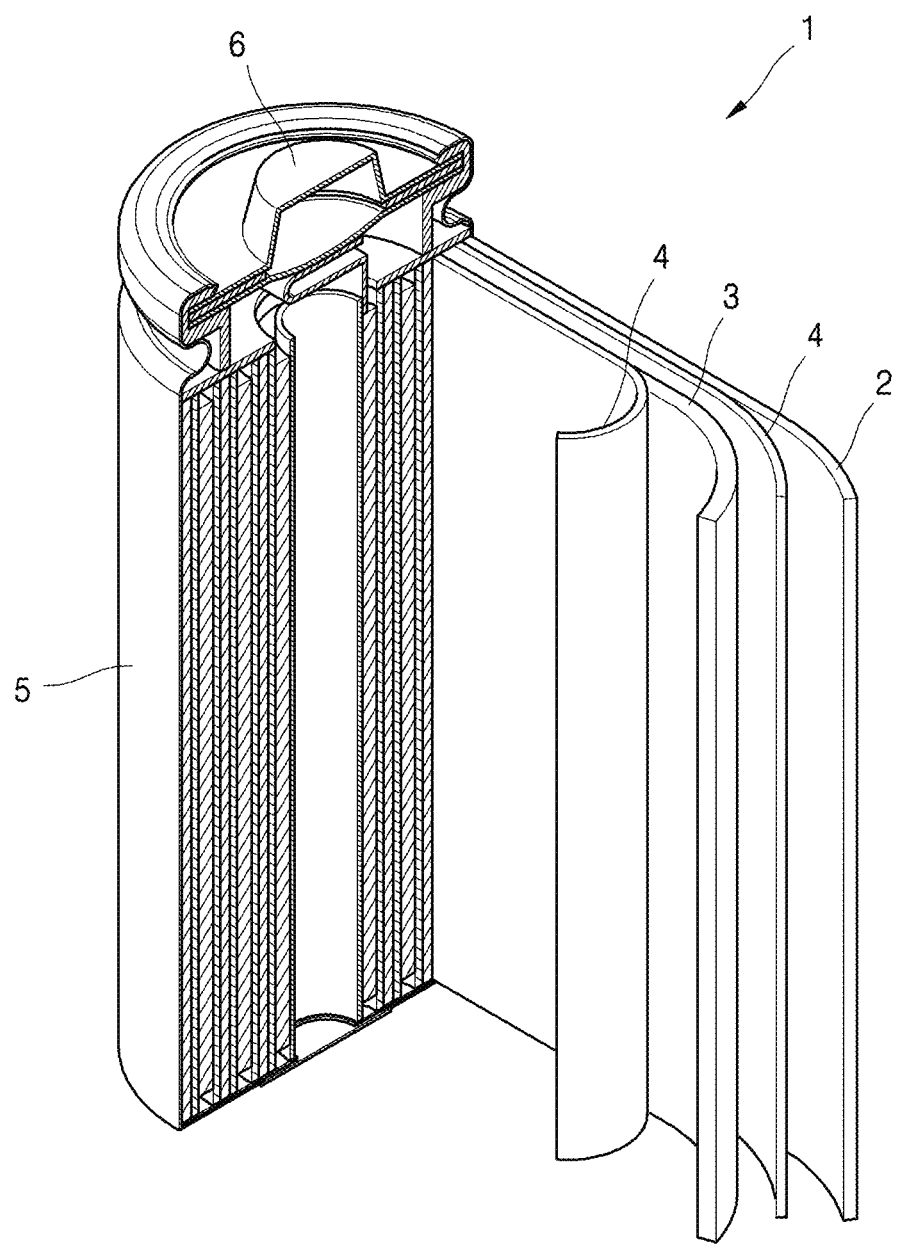
FIG. 1C is a schematic view of an embodiment of a sodium battery.

FIG. 1C is a schematic view of another embodiment of a sodium battery.

As shown in FIG. 1C, a sodium secondary battery 1 includes a positive electrode 3, a negative electrode 2, and a separator 4.

The positive electrode 3, the negative electrode 2, and the separator 4 may be wound or folded and then accommodated in a battery case 5. Subsequently, the electrolyte is disposed into the battery case 5, and the battery case 5 is then sealed by a cap assembly 6, thereby completing the manufacture of the sodium secondary battery 1. The battery case 5 may be a cylindrical type, a rectangular type, or a thin-film type. In some embodiments, the sodium secondary battery may be a large thin-film type battery. For example, the sodium secondary battery may be a sodium ion secondary battery.

A separator may be interposed between the positive electrode and the negative electrode to form a battery assembly. Alternatively, the battery assembly may be stacked in a bi-cell structure and impregnated with an organic electrolyte solution. The resultant may be put into a pouch and sealed, thereby completing the manufacture of a sodium polymer battery.

Also, a plurality of battery assemblies may be stacked to form a battery pack, which may be used in a device, a device that uses high output, for example, a laptop computer, a smart phone, electric vehicle, and the like.

A magnesium secondary battery may have the same structure with a sodium secondary structure, except that a positive electrode, a negative electrode, a separator, and an electrolyte for a sodium secondary battery are replaced with a positive electrode, a negative electrode, a separator, and an electrolyte for a magnesium secondary battery as shown in FIG. 1C.

In the non-lithium secondary battery according to an embodiment, initial efficiency deterioration is suppressed, and storage stability, thermal stability, and life characteristics are improved. Therefore, the non-lithium secondary battery may be used in a battery cell for a power source of a miniaturized device. Also, the non-lithium secondary battery may be used in a medium-to-large sized battery pack including a plurality of battery cells or a unit battery in a battery module for a power source of a medium-to-large sized device.

Examples of the medium-to-large sized device include electric vehicles ("EV"s) such as hybrid electric vehicles ("HEV"s) and plug-in hybrid electric vehicles ("PHEV"s); and electric two-wheeled motorcycles such as electric bicycles (e.g., E-bikes) and electric scooters (e.g., E-scooters), but are not limited thereto

EXAMPLES

Preparation Example 1

Preparation of Negative Electrode Active Material

An Sb powder (>99.9%, Shape powder 150 μm PASS, High purity chemicals) having an average particle diameter of about 10 μm and Carbotron P powder (KUREHA) as a hard carbon powder, having an average particle diameter of about 4 nm to about 5 nm were mixed at a weight ratio of about 90:10. Here, the hard carbon powder had a specific surface area of about 28 m$^2$/g and a $I_D/I_G$ ratio in the Raman spectrum of about 0.964.

The mixture was milled by using a planetary miller in an argon gas atmosphere at a speed of about 300 revolutions per minute ("rpm") for about 30 minutes to obtain an Sb/hard carbon complex. During the milling process, zirconia beads were added to the miller so that the milling could be performed.

In the Sb/hard carbon complex, an amount of the hard carbon may be about 10 parts by weight, based on 100 parts by weight of the total weight of the complex.

Preparation Example 2

Preparation of Negative Electrode Active Material

An Sb/hard carbon complex was prepared in the same manner as in Preparation Example 1, except that the weight ratio of the Sb powder and the hard carbon was changed to 60:40.

In the Sb/hard carbon complex, an amount of the hard carbon was about 40 parts by weight based on 100 parts by weight of the total weight of the Sb/hard carbon complex.

Preparation Example 3

Preparation of Negative Electrode Active Material

An Sb/hard carbon complex was prepared in the same manner as in Preparation Example 1, except that the weight ratio of the Sb powder and the hard carbon was changed to 30:70.

In the Sb/hard carbon complex, an amount of the hard carbon was about 70 parts by weight, based on 100 parts by weight of the total weight of the Sb/hard carbon complex.

Preparation Example 4

Preparation of Negative Electrode Active Material

A TiO$_2$/hard carbon complex was prepared in the same manner as in Preparation Example 1, except that a titanium oxide (TiO$_2$) having an average particle diameter of about 21 nm was used instead of the Sb powder. A main phase of the titanium oxide is an anatase phase, and an auxiliary phase of the titanium oxide is a rutile phase.

In the TiO$_2$/hard carbon complex, an amount of the hard carbon was about 10 parts by weight, based on 100 parts by weight of the total weight of the TiO$_2$/hard carbon complex.

Preparation Example 5

Preparation of Negative Electrode Active Material

A tin oxide (SnO)/hard carbon complex was prepared in the same manner as in Preparation Example 1, except that a tin oxide (SnO) was used instead of the Sb powder.

In the SnO/hard carbon complex, an amount of the hard carbon was about 10 parts by weight, based on 100 parts by weight of the total weight of the SnO/hard carbon complex.

Preparation Example 6

A tin-iron (Sn$_2$Fe) alloy/hard carbon complex was prepared in the same manner as in Preparation Example 1, except that a tin (Sn) powder and an iron (Fe) powder were used instead of the Sb powder. A mixing ratio of the Sn powder and the Fe powder was a molar ratio of 2:1.

In the tin-iron alloy/hard carbon complex, an amount of the hard carbon was about 10 parts by weight based on 100 parts by weight of the total weight of the tin-iron alloy/hard carbon complex.

Preparation Example 7

A phosphorous (P)/hard carbon complex was prepared in the same manner as in Preparation Example 1, except that a milled phosphorous (P) powder was used instead of the Sb powder. Here, the milled P powder was obtained by performing high energy mechanical milling for about 24 hours.

In the P/hard carbon complex, an amount of the hard carbon was about 10 parts by weight based on 100 parts by weight of the total weight of the P/hard carbon complex.

Preparation Example 8

A tin-antimony (SnSb) alloy/hard carbon complex was prepared in the same manner as in Preparation Example 1, except that a Sn powder and an Sb powder were used instead of the Sb powder. A mixing ratio of the Sn powder and the Sb powder was a molar ratio of 1:1.

In the SnSb alloy/hard carbon complex, an amount of the hard carbon was about 10 parts by weight, based on 100 parts by weight of the total weight of the SnSb alloy/hard carbon complex.

Preparation Example 9

A silicon oxide (SiO)/hard carbon complex was prepared in the same manner as in Preparation Example 1, except that a silicon oxide ($SiO_2$) was used instead of the Sb powder.

In the SiO/hard carbon complex, an amount of the hard carbon was about 10 parts by weight, based on 100 parts by weight of the total weight of the SnO/hard carbon complex.

Comparative Preparation Example 1

Preparation of Negative Electrode Active Material

An Sb powder having an average particle diameter of about 10 μm was used as a negative electrode active material.

Comparative Preparation Example 2

Preparation of Negative Electrode Active Material

A complex was prepared in the same manner as in Preparation Example 1, except that Super-P was used instead of a Carbotron P powder (KUREHA) and that a weight ratio of the Sb powder and the hard carbon powder was changed to about 60:40. The Super-P had a specific surface area of about 58 $m^2/g$ and a $I_D/I_G$ ratio in the Raman spectrum of about 1.234.

Comparative Preparation Example 3

Preparation of Negative Electrode Active Material

A complex was prepared in the same manner as in Preparation Example 2, except that a mesoporous carbon was used instead of the Carbotron P powder (KUREHA). The mesoporous carbon has a specific surface area of about 1000 $m^2/g$.

Example 1

Preparation of Negative Electrode and Sodium Coin Half-Cell

The complex prepared in Preparation Example 1 as a negative electrode active material, carboxymethylcellulose ("CMC") as a binder, and vapor grown carbon fibers ("VGCF") as a conducting agent were mixed at a weight ratio of about 70:15:15 in an agate mortar to prepare a negative electrode active material slurry.

One surface of an aluminum foil, as a negative electrode current collector, was coated with the negative electrode active material slurry using a doctor blade, dried at room temperature (25° C.) for about 30 minutes, and then vacuum dried at a temperature of about 120° C. for about 2 hours to prepare a negative electrode.

The negative electrode thus prepared was used as a working electrode, a sodium metal was used as a counter electrode, and a glass fiber membrane (Whatman GF/F CAT No. 1825-150) was used to prepare a coin type half-cell. An electrolyte used in the preparation of the coin type half-cell was an electrolyte solution, in which 1 M of an electrolyte salt ($NaClO_4$) was dissolved in a mixture of ethylene carbonate ("EC") and diethyl carbonate ("DEC") (EC: DEC=1:1 at a volume ratio).

About 5 parts by volume of fluoroethylene carbonate ("FEC") based on 100 parts by volume of the total volume of the electrolyte was added to the electrolyte solution. Also, the preparation of the coin type half-cell was performed in a globe box filled with argon.

Examples 2 to 9

Preparation of Negative Electrode and Coin Half-Cell

Coin type half-cells were prepared in the same manner as in Example 1, except that the complexes prepared in Preparation Examples 2 to 9 were each used instead of the complex prepared in Preparation Example 1.

Example 10

Preparation of Negative Electrode and Magnesium Coin Half-Cell

The silicon oxide ($SiO_2$)/hard carbon complex prepared in Preparation Example 9 as a negative electrode active material, carboxymethylcellulose ("CMC") as a binder, and vapor grown carbon fibers ("VGCF") as a conducting agent at a weight ratio of about 70:15:15 were stirred mechanically for about 30 minutes to prepare a negative electrode active material slurry.

One surface of a copper foil, which is a negative electrode current collector, was coated with the negative electrode active material slurry by using a doctor blade, dried at room temperature (25° C.) for about 30 minutes, and then vacuum dried at a temperature of about 120° C. for about 2 hours to prepare a negative electrode.

The negative electrode was placed in a Teflon container, a magnesium foil having a thickness of about 100 μm was used as a counter electrode, an $Ag/AgNO_3$ electrode was used as a standard electrode, and an electrolyte solution including 0.5 M of an electrolyte salt ($NaClO_4$) dissolved in acetonitrile was used as an electrolyte to prepare a 3-electrode system. The Teflon container was filled with argon and was sealed to block air from the outside.

Comparative Examples 1 to 5

Preparation of Negative Electrodes and Coin Type Half-Cells

Coin type half-cells were prepared in the same manner as in Example 1, except that the Sb powder prepared in Comparative Preparation Example 1 and the complexes prepared in Comparative Preparation Examples 2 to 5 were each used instead of the complex prepared in Preparation Example 1.

Evaluation Example 1

X-Ray Diffraction ("XRD") Analysis

Figure 3:
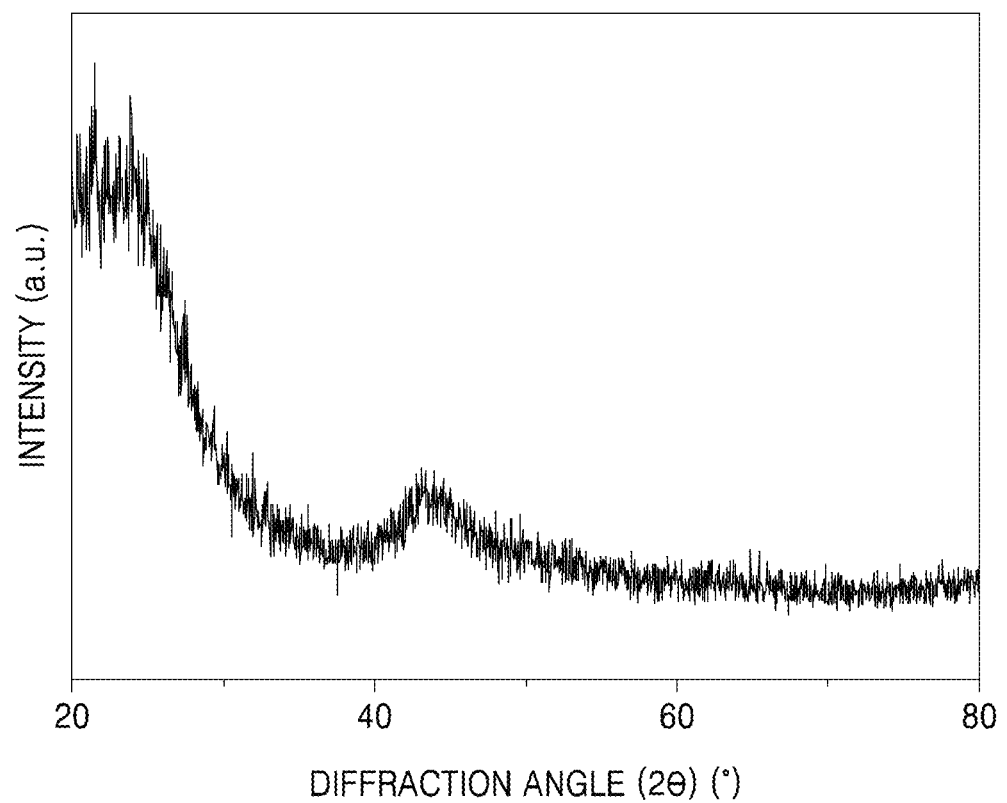
FIG. 3 is a graph of intensity (arbitrary units, a.u.) versus diffraction angle (degrees two-theta, 2θ) showing the results of XRD analysis of a hard carbon that is used in Preparation Examples 1 to 3.
Figure 4A:
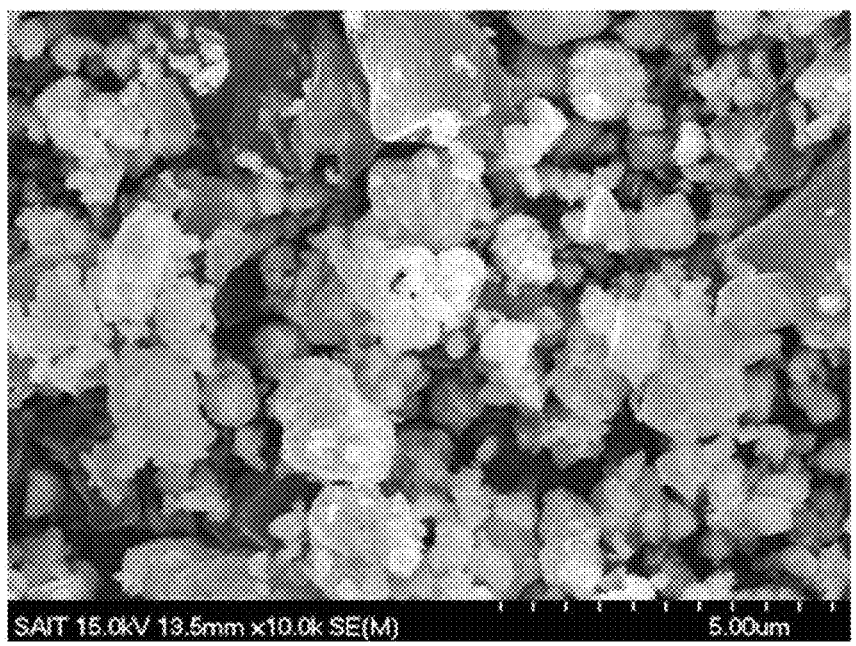
FIGS. 4A, 5A, 6A, and 7A are, each respectively, scanning electron microscope ("SEM") images of the complexes prepared in Preparation Examples 1 to 3 and the Sb powder prepared in Comparative Example 1.
Figure 4B:
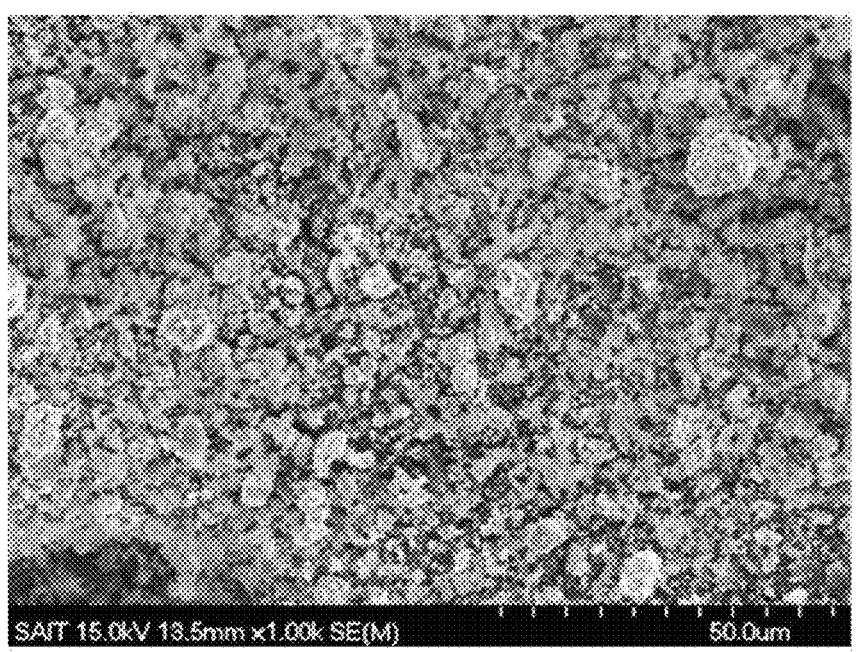
FIGS. 4B, 5B, 6B, and 7B are, each respectively, images of the complexes prepared in Preparation Examples 1 to 3 and the Sb powder prepared in Comparative Example 1 shown FIGS. 4A, 5A, 6A, and 7A, respectively, at a factor of about 10 less magnification.
Figure 5A:
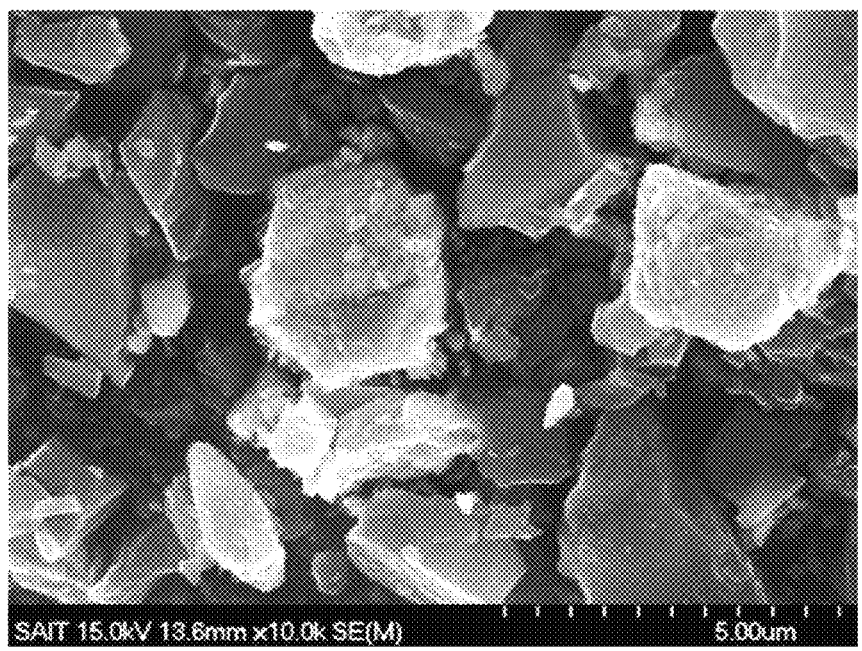
Figure 5B:
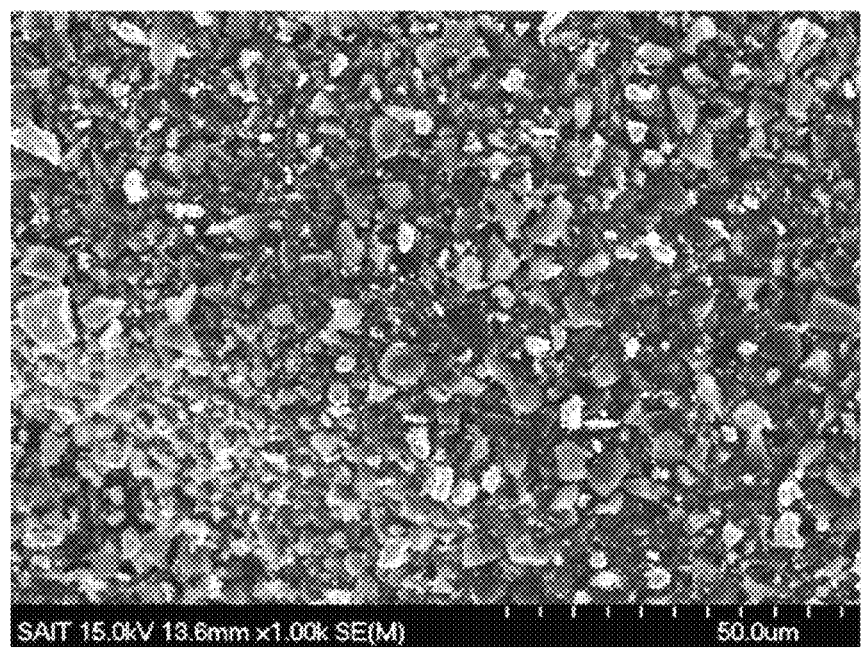
Figure 6A:
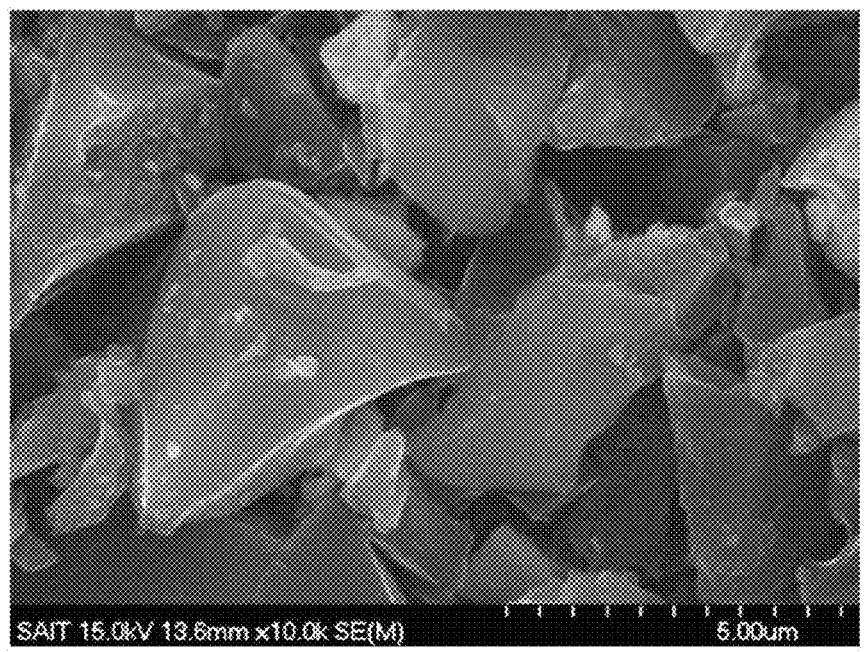
Figure 6B:
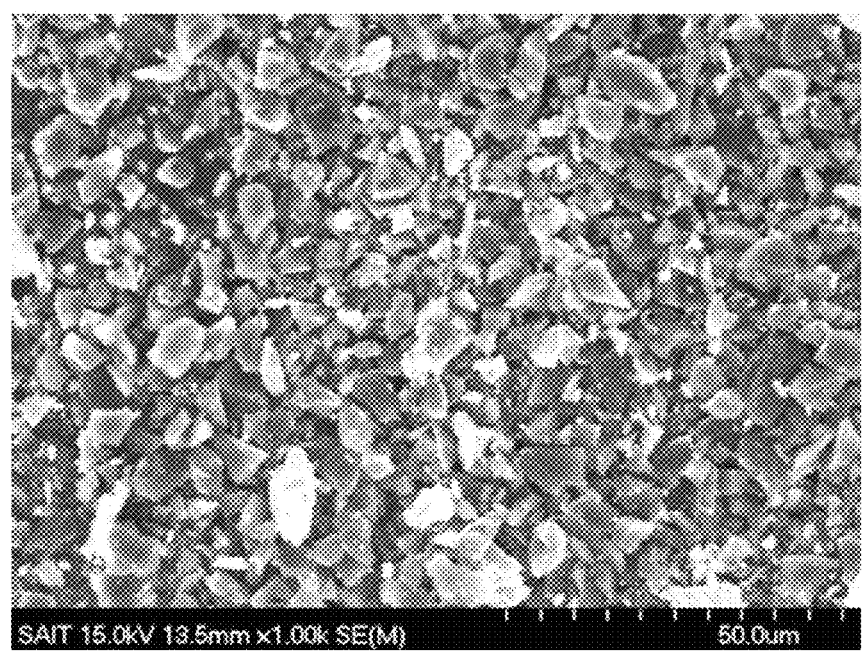
Figure 7A:
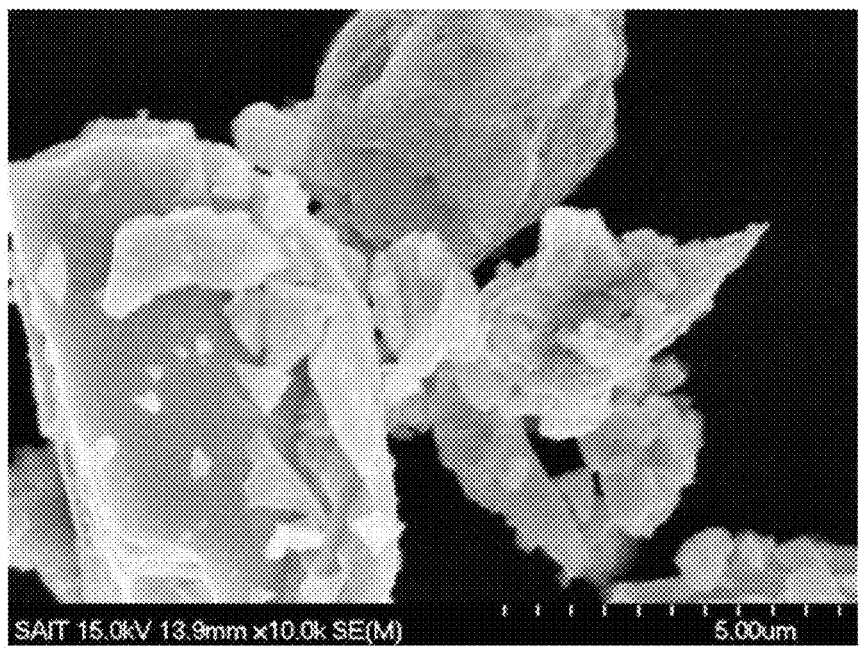
Figure 7B:
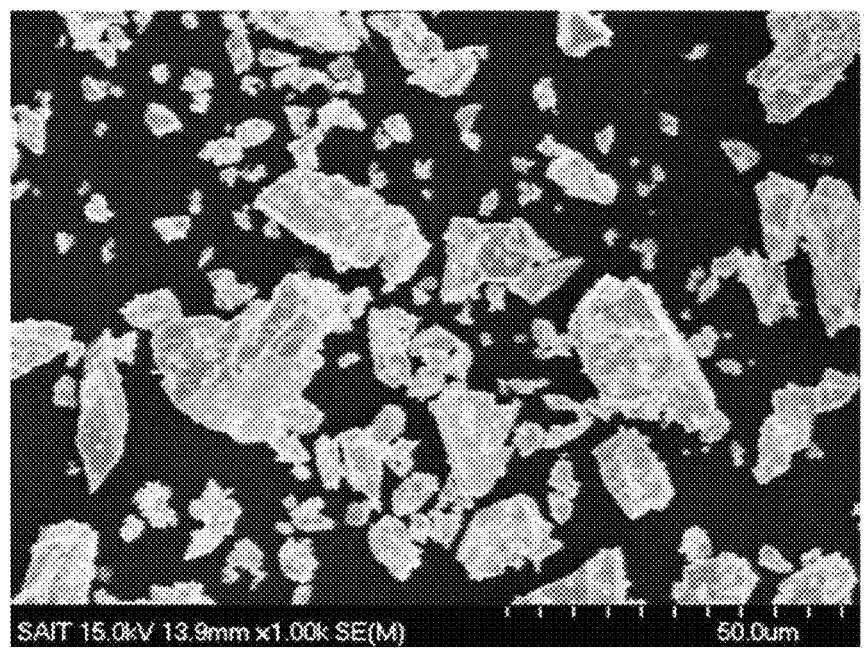

An X-ray diffraction ("XRD") analysis was performed on each of the complexes prepared in Preparation Examples 1 to 3 and the Sb powder prepared in Comparative Example 1. The XRD analysis was performed using a Rigaku RINT2200HF+ diffractometer using Cu-Kα radiation (1.540598 Å). The results of the XRD analysis are shown in FIGS. 2 and 3. FIG. 2 is the results of the XRD analysis performed on the complexes prepared in Preparation Examples 1 to 3 and the Sb powder prepared in Comparative Example 1, and FIG. 3 is the XRD analysis performed on a hard carbon used in preparation of the complexes of Preparation Examples 1 to 3.

As the results of the XRD analysis, the complexes prepared in Preparation Examples 1 to 3 had a Sb characteristic peak in a region where a diffraction angle (degrees two-theta, 2θ) is about 51° as same with the Sb powder prepared in Comparative Example 1. In this regard, it may be known that the complexes prepared in Preparation Examples 1 to 3 had a Sb XRD pattern which was maintained the same. Also, the complexes prepared in Preparation Examples 1 to 3 had the XRD pattern of a hard carbon which was maintained the same.

Evaluation Example 2

Scanning Electron Microscopy-Energy Dispersive Spectroscopy (SEM-EDS)

Each of the complexes prepared in Preparation Examples 1 to 3 and the Sb powder prepared in Comparative Example 1 was analyzed by scanning electron microscopy ("SEM"). The SEM analysis results are shown in FIGS. 4A, 4B, 5A, 5B, 6A, and 7A.

FIGS. 4A, 5A, 6A, and 7A are images of the materials prepared in Preparation Examples 1 to 3 and Comparative Preparation Example 1, respectively, and FIGS. 4B, 5B, 6B, and 7B are the same materials as in FIGS. 4A, 5A, 6A, and 7A, respectively, at a factor of about 10 less magnification.

In this regard, it may be known that an average particle diameter of secondary particles of the complex increased as an amount of the hard carbon in the complex increased.

Figure 13:
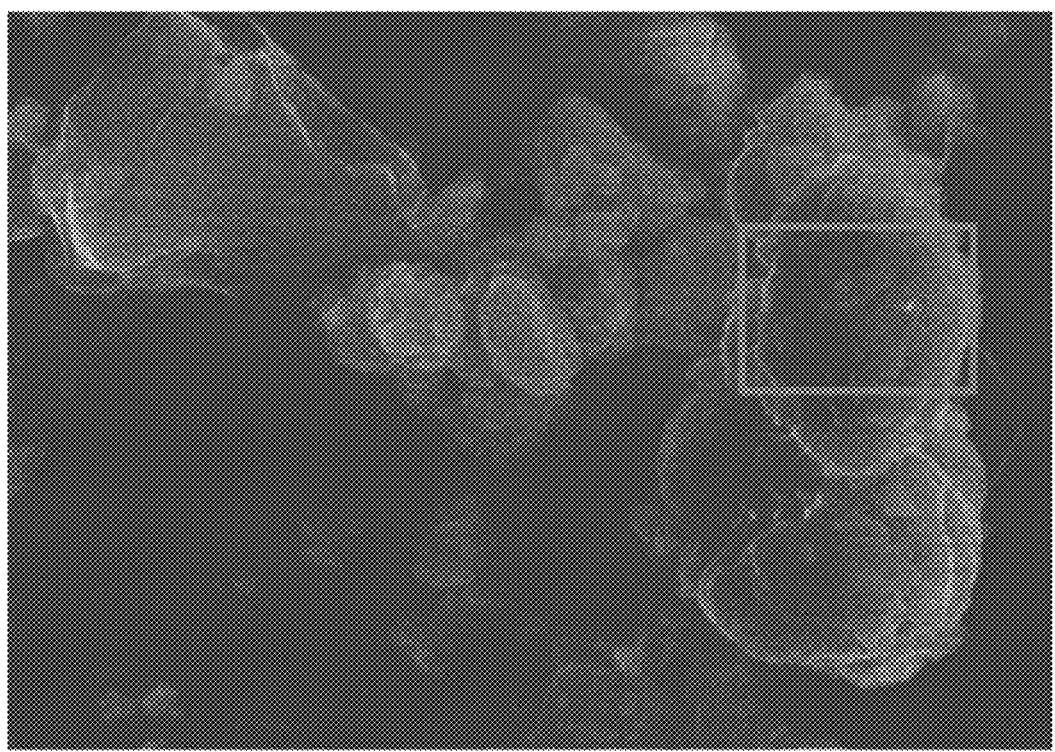
FIG. 13 shows the results of SEM energy-dispersive spectrometry ("EDS") analysis of the complex prepared in Preparation Example 1.
Figure 14:
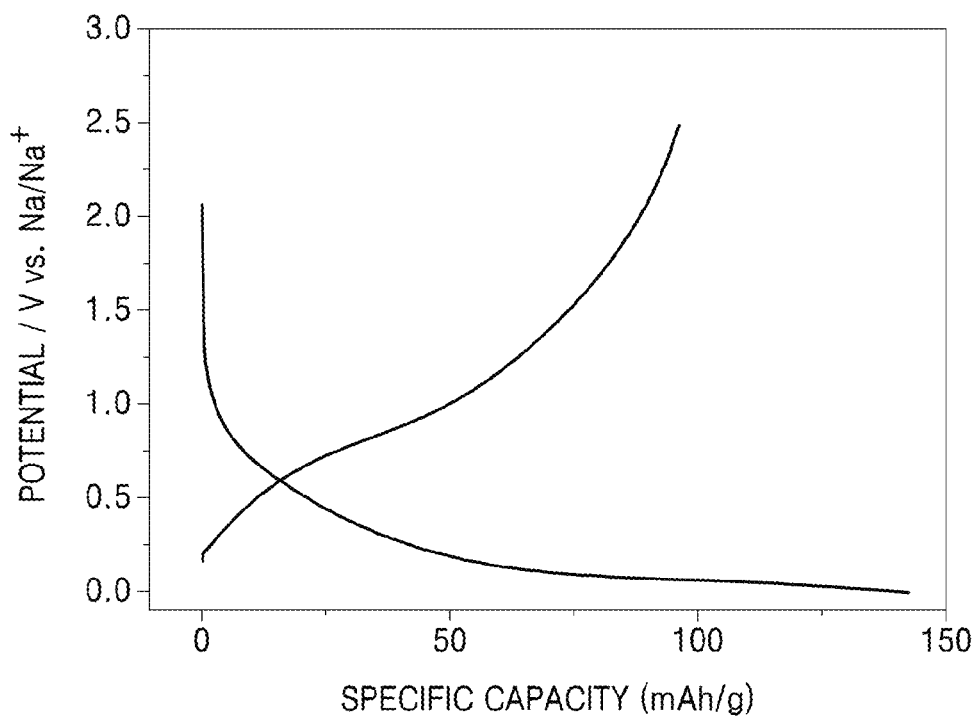
FIGS. 14 to 20 are each a graph of potential (volts versus Na/Na$^+$) versus specific capacity (milliampere-hours per gram, mAh/g) which show a change in specific capacity versus potential of the coin type half-cells prepared in Examples 4 to 10.
Figure 15:
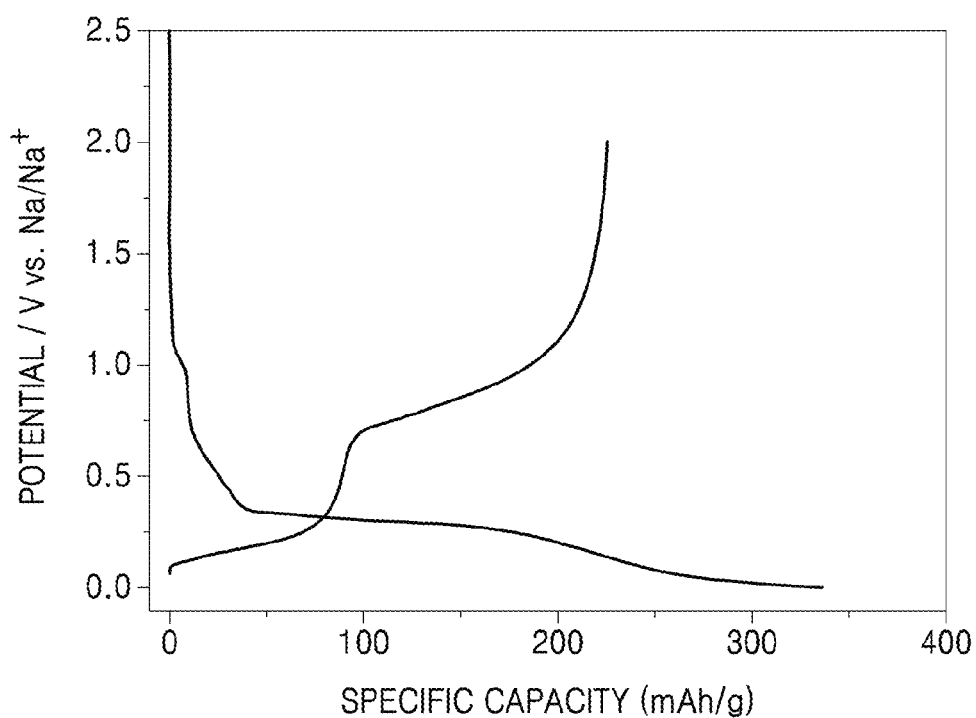
Figure 16:
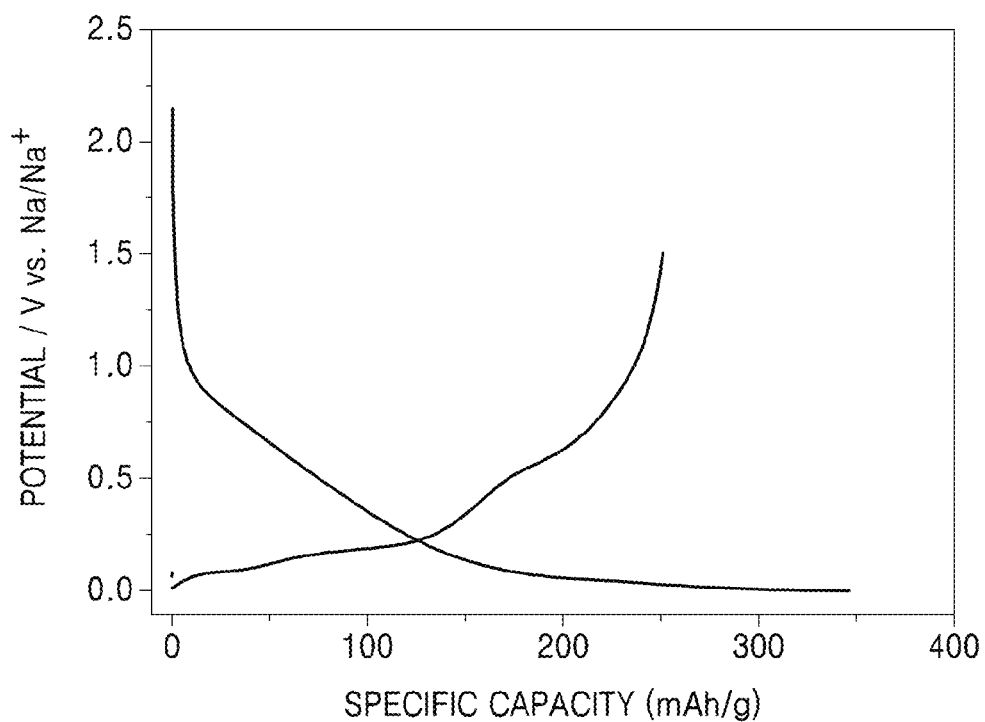
Figure 17:
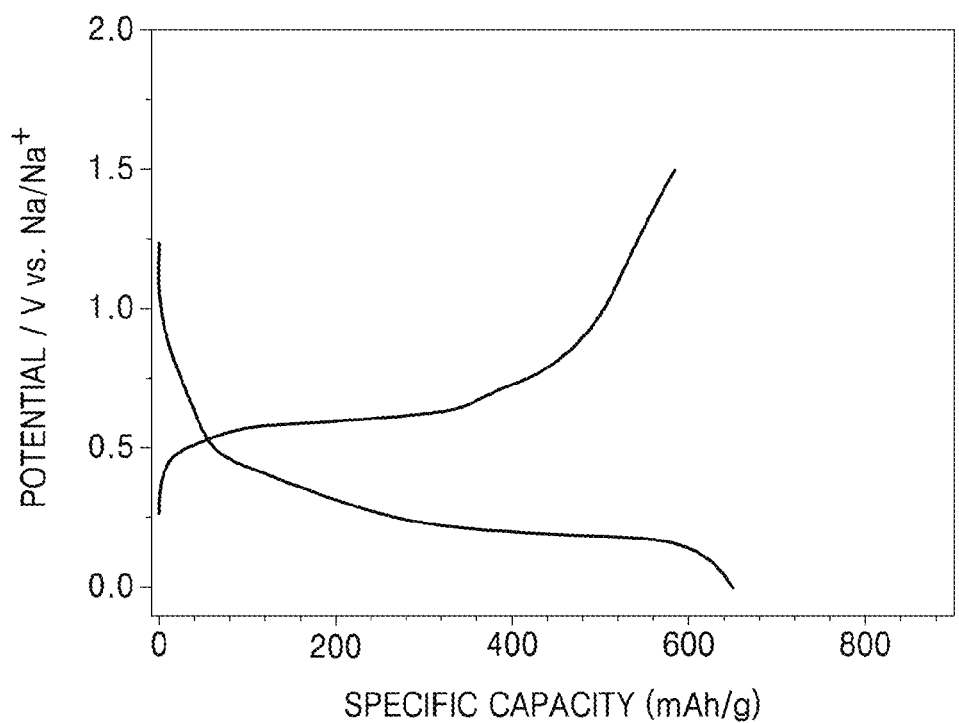
Figure 18:
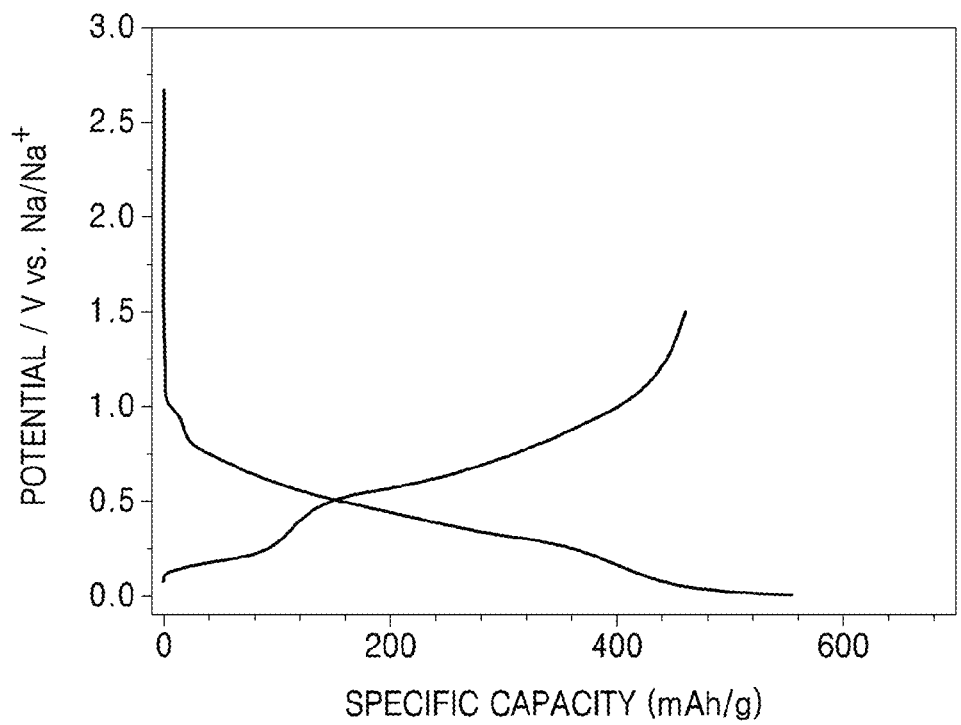
Figure 19:
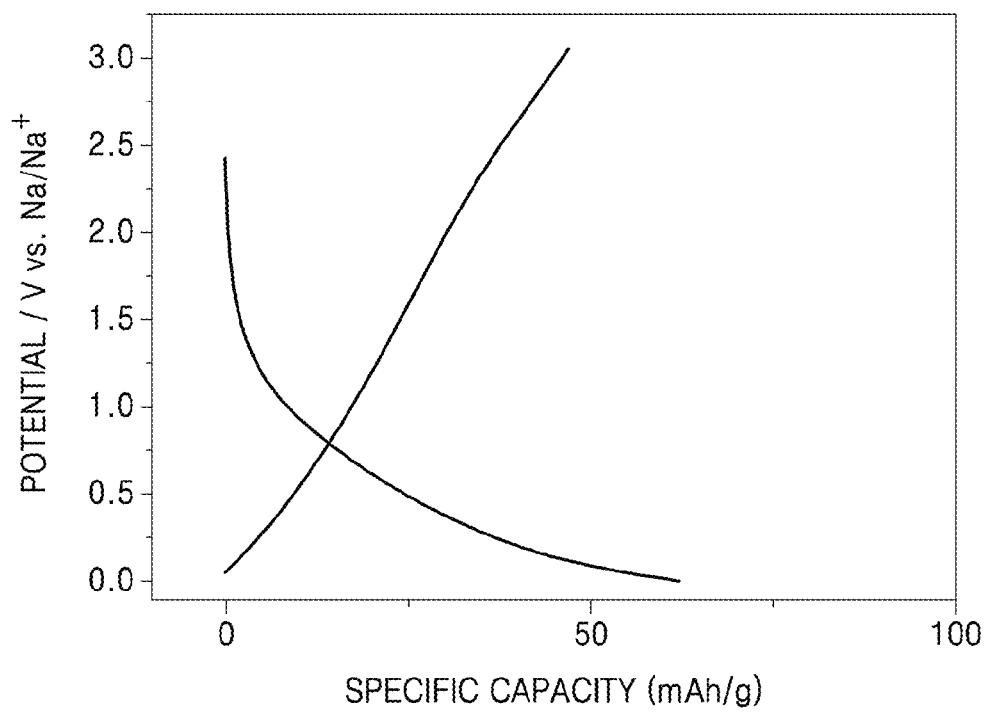
Figure 20:
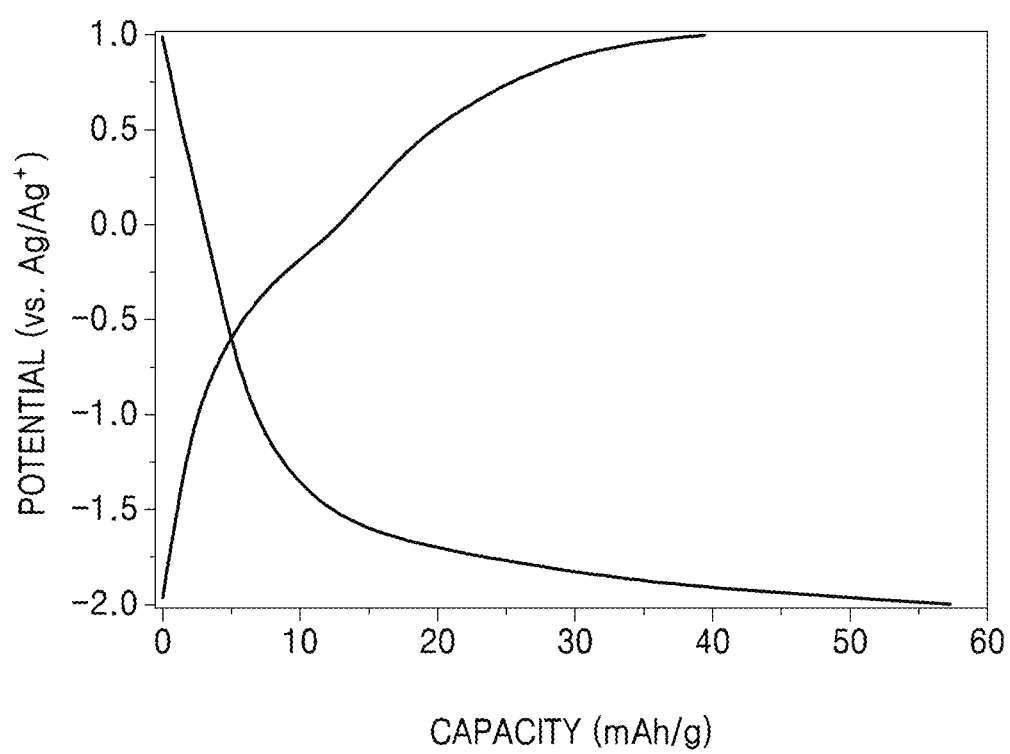

FIG. 13 illustrates the SEM-EDS analysis result of the complex prepared in Example 1. Referring to FIG. 13, particles having hard carbon coating layers formed on Sb particles were observed.

In FIG. 13, an amount of each of the components in a squared area was measured, and the results are shown in Table 1.

TABLE 1

| Component | wt % | Atomic % |
|---|---|---|
| C | 13.69 | 61.65 |
| Sb | 86.31 | 38.35 |
| Total | 100 | 100 | wt % is weight percent, Atomic % is atomic percent.

Also, the negative electrode active material prepared in Comparative Preparation Example 5 was analyzed by SEM.

Evaluation Example 3

Charging/Discharging Characteristics (Initial Efficiency and Life Characteristics)

Charging/discharging evaluation was performed on each of the coin type half-cells prepared in Examples 1 to 3 and Comparative Examples 1 to 3.

Each of the coin type half-cells prepared in Examples 1 to 3 and the coin type half-cells prepared in Comparative Examples 1 to 3 were charged at a constant current of 0.1 C at a temperature of 25° C. to a cell voltage of about 1.5 V (vs Na/Na+), then the cells were discharged to a cell voltage of 0.005 V, and then an initial discharge capacity was measured. Thereafter, the cell was charged at a constant current of 0.1 C until a final charge voltage of the cell was 1.5 V.

After performing the discharge, a discharge capacity was measured and was referred to as "an initial discharge capacity". A cycle of the charging and discharging process described above was repeated 40 times to evaluate charging and discharging characteristics of the cell.

The initial charging/discharging efficiencies and capacity retention rates are each respectively represented by Equation 1 and Equation 2.

$$\text{An initial charging/discharging efficiency [\%]} = (\text{a } 1^{st} \text{ cycle discharge capacity/a } 1^{st} \text{ cycle charge capacity}) \times 100 \quad \text{Equation 1}$$

$$\text{A capacity retention rate [\%]} = (\text{a } 40^{th} \text{ cycle discharge capacity/a } 1^{st} \text{ cycle discharge capacity}) \times 100 \quad \text{Equation 2}$$

Figure 8:
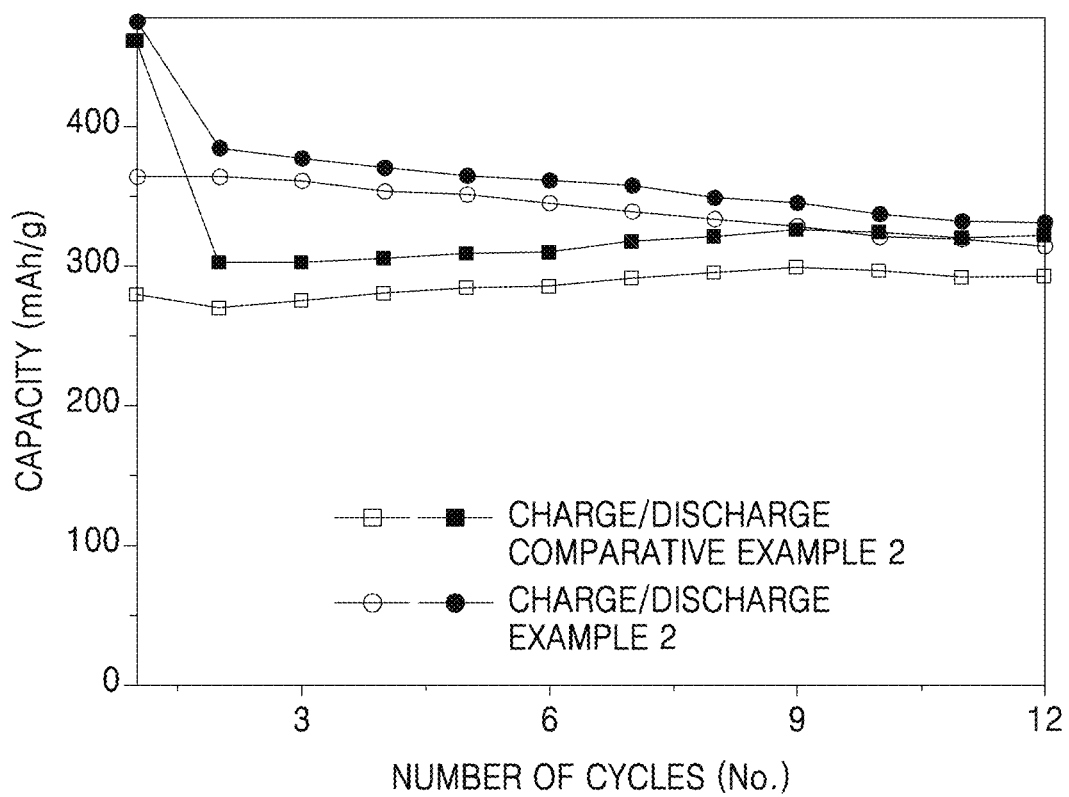
FIG. 8 is a graph of capacity (milliampere-hours per gram, mAh/g) versus number of cycles (number, No.) which shows initial efficiency characteristics of coin type half-cells prepared in Example 2 and Comparative Example 2.
Figure 9:
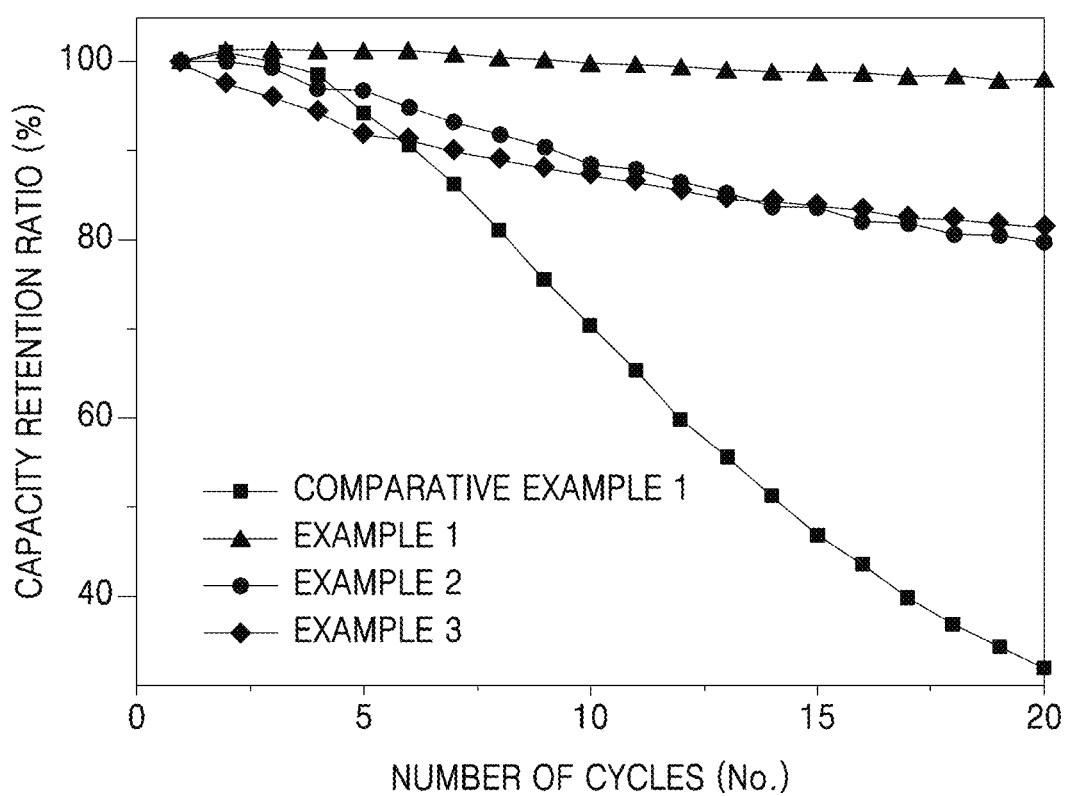
FIG. 9 is a graph of capacity retention ratio (percent, %) versus number of cycles (number, No.) which shows a change in a capacity retention rate of coin type half-cells prepared in Examples 1 to 3 and Comparative Example 1.

The results of the charging/discharging are shown in Table 1 and FIGS. 8 and 9.

In Table 1, the initial discharge capacity and the initial charge capacity each respectively denotes a discharge capacity and a charge capacity after $1^{st}$ cycle of charging/discharge.

TABLE 2

| | Active material composition (weight ratio vs carbon) | Initial discharge capacity (mAh/g) | Initial charge capacity (mAh/g) | Initial charging/ discharging efficiency (%) |
|---|---|---|---|---|
| Example 1 | 9:1 | 838.6 | 643.5 | 76.7 |
| Example 2 | 6:4 | 474.8 | 364.4 | 76.8 |
| Example 3 | 3:7 | 457.4 | 342.9 | — |
| Comparative Example 1 | 100:0 | 786.4 | 602.2 | 76.6 |
| Comparative Example 2 | 6:4 | 462.4 | 280.2 | 60.6 |
| Comparative Example 3 | — | — | — | 30.0% |

Referring to Table 2, it may be known that a decrease in an initial efficiency was suppressed in the coin-type half-cells prepared in Examples 1 and 2 using hard carbon as carbon compared to that in the coin-type half-cell prepared in Comparative Example 2 using Super-P as carbon. Also, the coin-type half-cell prepared in Comparative Example 3 had a significantly low initial charging/discharging efficiency compared to that of the coin-type half-cell prepared in Comparative Example 3. In this regard, the initial charging/discharging efficiency characteristics appeared significantly low as a reversible capacity is low when mesoporous carbon with a substantially high initial irreversible capacity is used in the preparation of a complex.

FIG. 8 illustrates a capacity change in the coin-type half-cell within 12 cycles of the charging and discharging, and FIG. 9 illustrates capacity retention rate characteristics of the coin-type half-cell when $20^{th}$ cycle is repeatedly performed.

Referring to FIG. 8, it may be known that the coin-type half-cell of Example 2 has an improved initial efficiency compared to that of the coin-type half-cell of Comparative Example 2.

Referring to FIG. 9, it may be known that the coin-type half-cells prepared in Examples 1 to 3 have improved life characteristics compared to the coin-type half-cell prepared in Comparative Example 1.

Evaluation Example 4

Rate Characteristics

Rate characteristics of the coin-type half-cell of Example 1 and the coin-type half-cell of Comparative Example 1 were evaluated as follows.

Each of the coin type half-cells prepared in Example 1 and the coin type half-cell prepared in Comparative Examples 1 were charged at a constant current of 0.1 C at a temperature of 25° C. to a cell voltage of about 1.5 V (vs Na/Na$^+$), and then discharged the cell until a voltage of the cell was 0.005 V, and then an initial discharge capacity was measured. Thereafter, the cell was charged at a constant current of 0.1 C to a final charge cell voltage of 1.5 V.

40 cycles of the charging and discharging were performed on the coin-type half-cells at a constant current of 0.2 C, 0.5 C, 1 C, 2 C, 5 C, 10 C, and 0.1 C per every 5 cycles at a voltage window within about 0.005 V to about 1.5 V, and thus the rate characteristics of the coin-type half-cells of Example 1 and Comparative Example 1 were evaluated.

Figure 10:
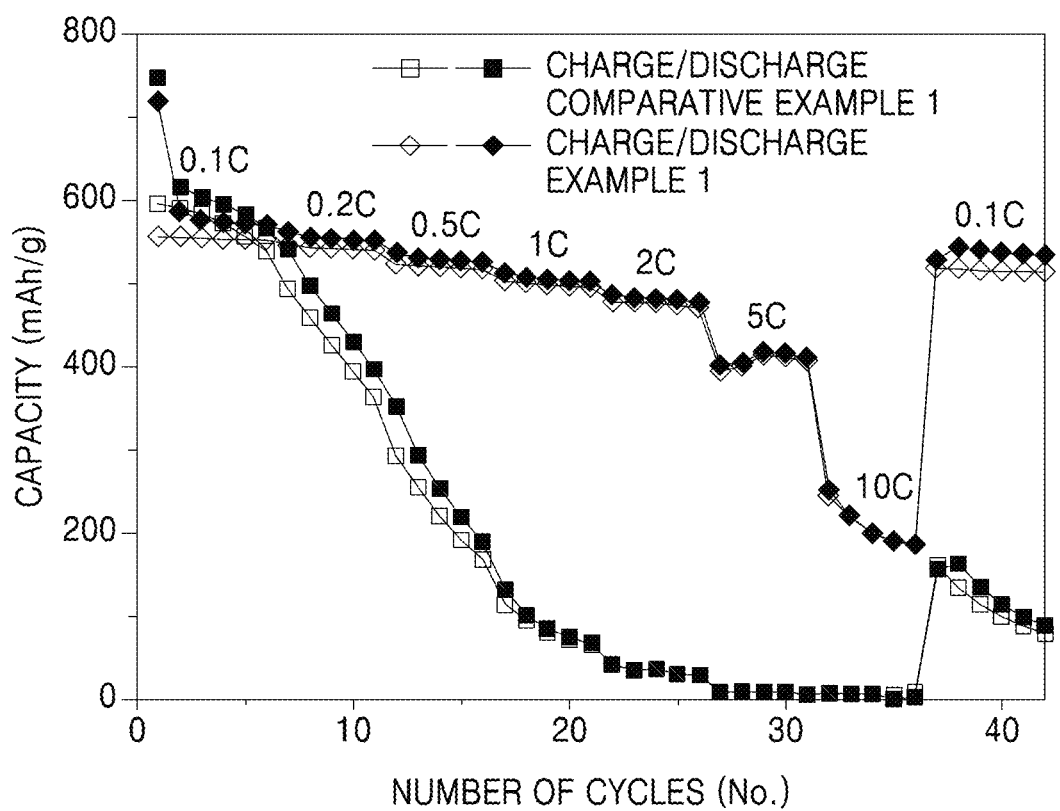
FIG. 10 is a graph of capacity (milliampere-hours per gram, mAh/g) versus number of cycles (number, No.) which shows rate characteristics of the coin type half-cells prepared in prepared in Example 1 and Comparative Example 1.

As shown in FIG. 10, it was confirmed that the coin-type half-cell of Comparative Example 1 had poor rate characteristics as a C-rate (charging/discharging rate) increased, whereas the coin-type half-cell of Example 1 had improved rate characteristics when the C-rate increased.

Evaluation Example 5

Electric Conductivity and Impedance

Electric conductivities of the complex of Preparation Example 2 and the Sb powder of Comparative Example 1 were measured.

The electric conductivities were measure measured by measuring electric resistances by using a 4-point probe method. An instrument used in the measurement was Mitsubishi Chemical Analytech. MCP-PD51.

Electric conductivities of the complex of Preparation Example 2 and the Sb powder of Comparative Example 1 were measured, and the results are shown in Table 3.

TABLE 3

| | Electric conductivity (mS/cm) (×10$^{-6}$) | | | | |
|---|---|---|---|---|---|
| Pressure* (kN) | 4 | 8 | 12 | 16 | 20 |
| Example 2 | 27.65 | 41.42 | 53.31 | 64.06 | 74.49 |
| Comparative Example 1 | — | 318.9 | 418.0 | 525.4 | 648.4 |

*Pressure denotes a strength of pressing a sample when measuring its electric conductivity.

As shown in Table 3, it was confirmed that the complex of Example 2 has excellent electric conductivity characteristics compared to the Sb powder (a metal powder) of Comparative Example 1.

Figure 11:
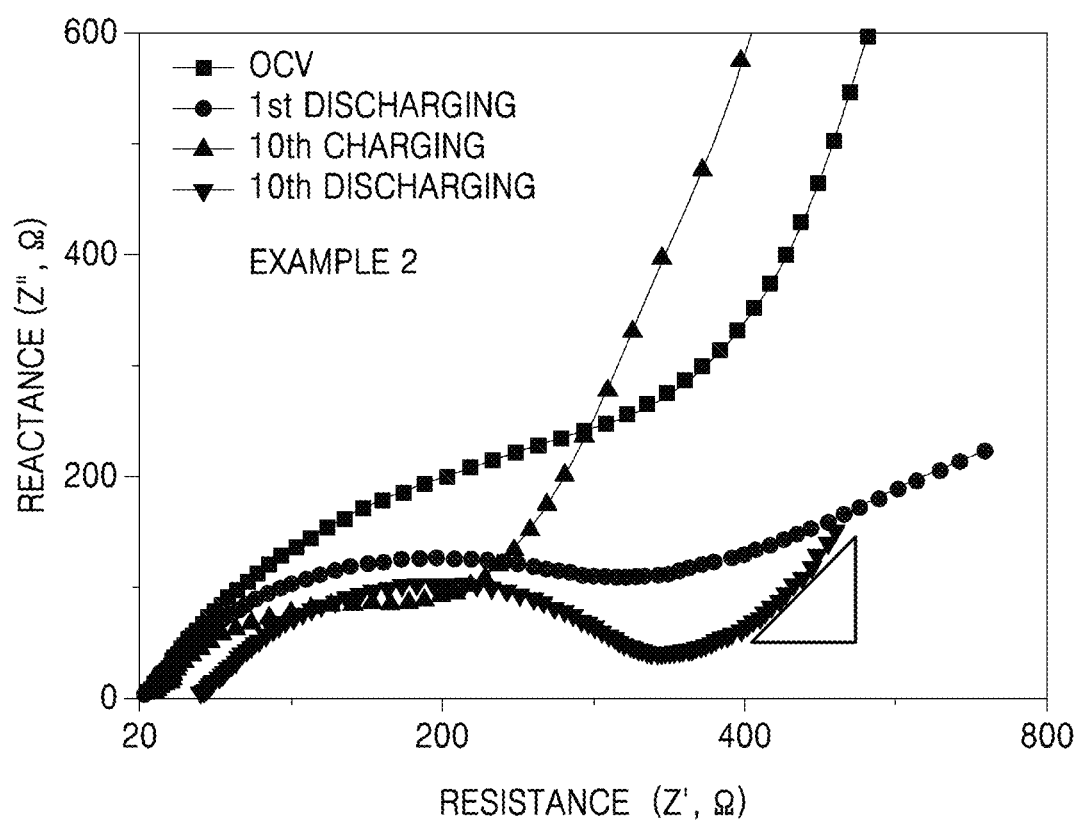
FIGS. 11 and 12 are graphs of reactance (−Z", Ω) versus resistance (Z', Ω) which show impedance characteristics of the coin type half-cells prepared in Example 2 and Comparative Example 1.
Figure 12:
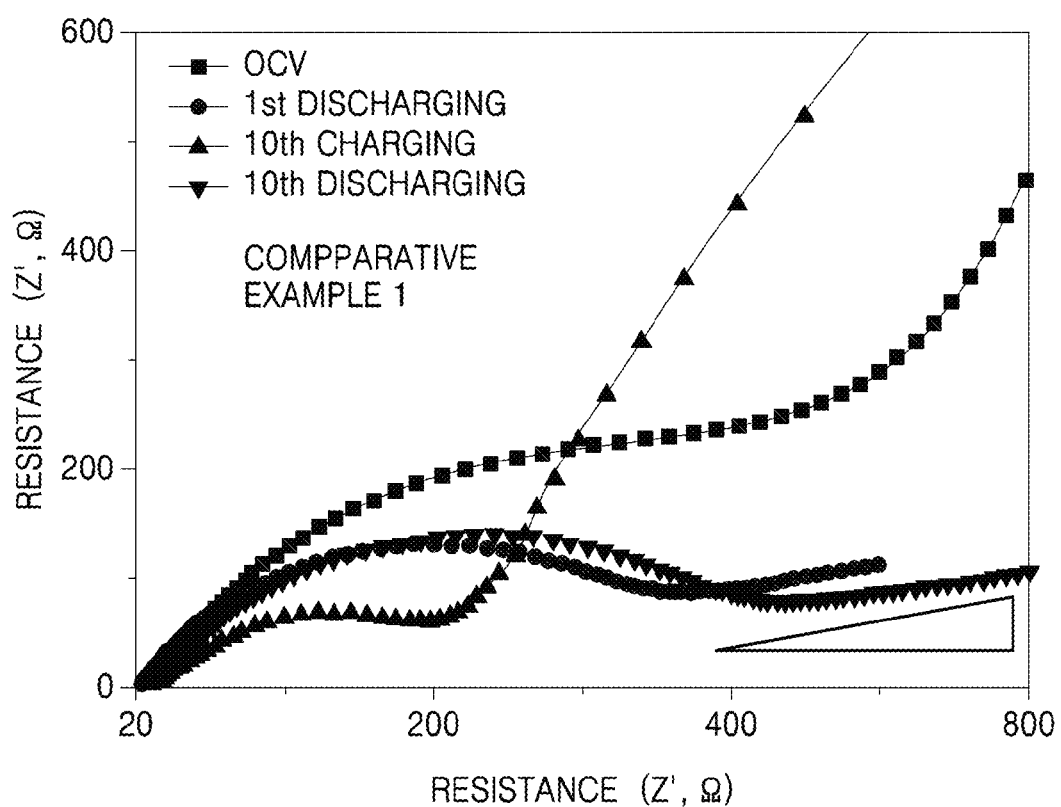

Also, each of the coin type half-cells prepared in Example 2 and Comparative Example 1 was charged at a constant current of 0.1 C at a temperature of 25° C. to a cell voltage of about 1.5 V (vs Na/Na$^+$), discharged to 0.005 V, and then charged to a final cell charge voltage of 1.5 V. In this regard, after one charge/discharge cycle, 10 cycles were proceeded under the same charging and discharging conditions described above, and then impedances of the coin-type half cells at an open circuit voltage ("OCV") were measured. The results are shown in FIGS. 11 and 12. An alternating current ("AC") impedance was measured by performing a 2-probe method on the coin-type half-cells using an impedance analyzer (Solatron SI1260 impedance/gain-phase analyzer). A frequency range was about 0.1 Hertz (Hz) to about 1 megaHertz (MHz), and an amplitude voltage was about 10 millivolts (mV). The impedance measurement was performed at room temperature (25° C.), and the results are shown in FIGS. 11 and 12.

After 10 cycles of the charging and discharging, the coin-half cell prepared in Comparative Example 1 had a low Warburg diffusion tail slope of the bare Sb compared to that of the coin-half cell prepared in Example 2, and, in this regard, and while not wanting to be bound by theory, it may be known that a relatively thick solid electrolyte interphase ("SEI") film was formed on a surface of the negative electrode active material layer, and thus a resistance of the coin-half cell increased. Also, it may be known that an electric conductivity of the coin-half cell prepared in Comparative Example 1 had a value that is about 9 times greater than an electric conductivity of the coin-half cell prepared in Example 2, but the whole resistance values of the batteries prepared in Comparative Example 1 and Example 2 was similar to each other, and thus an interfacial resistance and ohmic resistance value of the coin-half cell prepared in Example 2 were lower than those of the coin-half cell prepared in Comparative Example Evaluation Example 6

Measurement of Potential Change According to Specific Capacity

Potential changes of the coin-half cells prepared in Examples 4 to 10 according to their specific capacities were measured as follows.

Examples 4, 5, 6, and 9

The coin-half cells prepared in Examples 4, 5, 6, and 9 were charged and discharged within a potential window of about 0.005 V to about 2.5 V (vs. Na/Na$^+$) with a constant current of 0.1 C at a temperature of 25° C., and specific capacity vs potential characteristics of the sodium coin-half cells prepared in Examples 4, 5, 6, and 9 during the first cycle of the charging and discharging were evaluated.

Example 7

Specific capacity vs potential characteristics of the sodium coin-half cell prepared in Example 7 was evaluated in the same manner as in Example 5, except that the potential window was about 0.005 V to about 1.5 V instead of about 0.005 V to about 2.5 V.

Example 8

Specific capacity vs potential characteristics of the sodium coin-half cell prepared in Example 8 was evaluated in the same manner as in Example 5, except that the potential window was about 0.005 V to about 3.0 V instead of about 0.005 V to about 2.5 V.

Example 10

The magnesium coin-half cell prepared in Example 10 was charged and discharged within a potential window of about 2.0 V to about 1.0 V (vs. Ag/Ag$^+$) with a constant current of 15 mA/g at a temperature of 25° C.

After performing the first cycle of the charging and discharging, specific capacity vs potential characteristics of the magnesium coin-half cell prepared in Example 10 was evaluated.

The results of measuring the potential change according to specific capacities of the coin-half cells prepared in Examples 4 to 10 are shown in FIGS. 14 to 20.

Referring to FIGS. 14 to 20, it was confirmed that the coin-half cells prepared in Examples 4 to 10 had improved cell performance.

As described above, when the disclosed negative electrode active material is used, a non-lithium secondary battery, such as a sodium secondary battery or a magnesium secondary battery, may have an improved capacity, an improved initial efficiency, and improved life characteristics.

It should be understood that the exemplary embodiments described herein should be considered in a descriptive sense only and not for purposes of limitation. Descriptions of features, advantages, or aspects within each embodiment should be considered as available for other similar features, advantages, or aspects in other embodiments.

While one or more embodiments have been described with reference to the figures, it will be understood by those of ordinary skill in the art that various changes in form and details may be made herein without departing from the spirit and scope of the present disclosure as defined by the following claims.

What is claimed is:

1. A negative electrode active material for a non-lithium secondary battery, the negative electrode active material comprising a complex comprising:
    a hard carbon having a specific surface area of about 50 square meters per gram or less and a ratio of a D-band peak intensity to a G-band peak intensity of about 1 or less when analyzed by Raman spectroscopy; and
    a component comprising at least one selected from a Group 1 element, an oxide of a Group 1 element, a Group 2 element, an oxide of a Group 2 element, an element of Groups 13 to 16, an oxide of an element of Groups 13 to 16, and an oxide of an element of Groups 3 to 12;
    wherein an average particle diameter of the hard carbon is in a range of about 1 nanometer to about 10 nanometers.

2. The negative electrode active material of claim 1, wherein the component comprises at least one selected from an alkali metal, an oxide of an alkali metal, an alkaline-earth metal, an oxide of an alkaline-earth metal, a post-transition metal, an oxide of a post-transition metal, a metalloid, an oxide of a metalloid, and a transition metal oxide.

3. The negative electrode active material of claim 1, wherein the component is at least one selected from antimony (Sb), an antimony (Sb) alloy, tin (Sn), a tin (Sn) alloy, lead (Pb), magnesium (Mg), a magnesium (Mg) alloy, calcium (Ca), germanium (Ge), rubidium (Rb), a tin oxide of the formula SnO$_x$ wherein 0≤x≤2, an antimony oxide, a magnesium oxide, a germanium oxide, a titanium oxide, a vanadium oxide, a silicon oxide, and a molybdenum oxide.

4. The negative electrode active material of claim 1, wherein an amount of the hard carbon is in a range of about 0.3 part to about 97 parts by weight, based on 100 parts by weight of the total weight of the complex.

5. The negative electrode active material of claim 1, wherein the specific surface area of the hard carbon is in a range of about 10 square meters per gram to about 50 square meters per gram.

6. The negative electrode active material of claim 1, wherein the specific surface area of the hard carbon is in a range of about 10 square meters per gram to about 30 square meters per gram.

7. The negative electrode active material of claim 1, wherein the component of the complex comprises a layer of the hard carbon on a surface of the component.

8. The negative electrode active material of claim 1, wherein the complex is in the form of secondary particles, which are agglomerates of primary particles, and wherein an average particle diameter of the secondary particles is in a range of about 1 micrometer to about 5 micrometers.

9. The negative electrode active material of claim 1, wherein the component is at least one selected from antimony (Sb), a titanium oxide, a tin oxide of the formula SnO$_x$ wherein 0≤x≤2, a tin-iron alloy, phosphorus, a tin-antimony alloy, and a silicon oxide.

10. The negative electrode active material of claim 1, wherein the component is magnesium or a magnesium alloy.

11. The negative electrode active material of claim 1, wherein the ratio of the D-band peak intensity to the G-band peak intensity is in a range of about 0.9 to about 1.

12. The negative electrode active material of claim 1, wherein the ratio of the D-band peak intensity to the G-band peak intensity is in a range of about 0.95 to about 0.99.

13. A method of preparing a negative electrode active material for a non-lithium secondary battery, the method comprising:
    mixing a hard carbon having a specific surface area of about 50 square meters per gram or less and a ratio of a D-band peak intensity to a G-band peak intensity of about 1 or less when analyzed by Raman spectroscopy, with a component comprising at least one selected from a Group 1 element, an oxide of a Group 1 element, a Group 2 element, an oxide of a Group 2 element, an element of Groups 13 to 16, and an oxide of an element of Groups 13 to 16, and an oxide of an element of Groups 3 to 12 at about 1000 revolutions per minute or less to form a complex to prepare the negative electrode active material, wherein an average particle diameter of the hard carbon is in a range of about 1 nanometer to about 10 nanometers.

14. The method of claim 13, wherein the mixing is performed by mechanical milling in an inert gas atmosphere.

15. The method of claim 13, wherein the mixing is performed for about 2 hours or less.

16. A negative electrode for a non-lithium secondary battery, the negative electrode comprising a negative electrode active material layer comprising the negative electrode active material of claim 1.

17. A non-lithium secondary battery comprising the negative electrode of claim 16.

18. A sodium secondary battery comprising the negative electrode of claim 16.

19. A magnesium secondary battery comprising the negative electrode of claim 16.

20. The negative electrode active material of claim 1, wherein the hard carbon has a ratio of a D-band peak intensity to a G-band peak intensity of about 0.9 to about 1.

* * * * *